United States Patent
Zhao et al.

(10) Patent No.: US 11,683,490 B2
(45) Date of Patent: Jun. 20, 2023

(54) CONTEXT ADAPTIVE TRANSFORM SET

(71) Applicant: TENCENT AMERICA LLC, Palo Alto, CA (US)

(72) Inventors: Xin Zhao, Santa Clara, CA (US); Madhu Peringassery Krishnan, Mountain View, CA (US); Shan Liu, San Jose, CA (US)

(73) Assignee: TENCENT AMERICA LLC, Palo Alto, CA (US)

(*) Notice: Subject to any disclaimer, the term of this patent is extended or adjusted under 35 U.S.C. 154(b) by 0 days.

(21) Appl. No.: 17/354,731

(22) Filed: Jun. 22, 2021

(65) Prior Publication Data

US 2022/0078423 A1    Mar. 10, 2022

Related U.S. Application Data

(60) Provisional application No. 63/077,381, filed on Sep. 11, 2020, provisional application No. 63/076,817, filed on Sep. 10, 2020.

(51) Int. Cl.
| | |
|---|---|
| *H04N 19/12* | (2014.01) |
| *H04N 19/105* | (2014.01) |
| *H04N 19/176* | (2014.01) |
| *H04N 19/159* | (2014.01) |
| *H04N 19/18* | (2014.01) |

(52) U.S. Cl.
CPC .......... *H04N 19/12* (2014.11); *H04N 19/105* (2014.11); *H04N 19/159* (2014.11); *H04N 19/176* (2014.11); *H04N 19/18* (2014.11)

(58) Field of Classification Search
CPC .... H04N 19/12; H04N 19/105; H04N 19/159; H04N 19/176; H04N 19/18
See application file for complete search history.

(56) References Cited

U.S. PATENT DOCUMENTS

| | | | |
|---|---|---|---|
| 9,788,019 B2 | 10/2017 | Liu et al. | |
| 2011/0268183 A1* | 11/2011 | Sole ................ | H04N 19/70 |
| | | | 375/240.18 |
| 2017/0150186 A1* | 5/2017 | Zhang ............. | H04N 19/625 |
| 2018/0091817 A1* | 3/2018 | Sole ................ | H04N 19/12 |

(Continued)

FOREIGN PATENT DOCUMENTS

| | | | | |
|---|---|---|---|---|
| EP | 3 836 543 A1 | 6/2021 | | |
| EP | 3836543 A1 * | 6/2021 | ............. | H04N 19/12 |

(Continued)

OTHER PUBLICATIONS

International Search Report dated Sep. 29, 2021 from the International Searching Authority in International Application No. PCT/US2021/039665.

(Continued)

*Primary Examiner* — Dramos Kalapodas
(74) *Attorney, Agent, or Firm* — Sughrue Mion, PLLC

(57) ABSTRACT

Systems and methods for coding and decoding of a coded bitstream is provided. A method comprises decoding a block of a picture from a coded bitstream. The decoding includes selecting a transform set based on at least one neighboring reconstructed sample from one or more previously decoded neighboring blocks or from a previously decoded picture and inverse transforming coefficients of the block using a transform from the transform set.

17 Claims, 26 Drawing Sheets

(56) References Cited

U.S. PATENT DOCUMENTS

| | | |
|---|---|---|
| 2019/0281321 A1 | 9/2019 | Zhao et al. |
| 2020/0177889 A1* | 6/2020 | Kim ........................ H04N 19/70 |
| 2020/0322636 A1* | 10/2020 | Egilmez ................. H04N 19/91 |
| 2022/0086490 A1* | 3/2022 | Koo ..................... H04N 19/122 |
| 2022/0109875 A1* | 4/2022 | Koo ..................... H04N 19/147 |

FOREIGN PATENT DOCUMENTS

| | | | |
|---|---|---|---|
| WO | 2010087807 A1 | 8/2010 | |
| WO | WO-2010087809 A1 * | 8/2010 | ........... H04N 19/119 |
| WO | 2019046671 A1 | 3/2019 | |
| WO | WO-2019185883 A1 * | 10/2019 | ............. H04N 19/12 |
| WO | WO-2020087807 A1 * | 5/2020 | ......... G02F 1/13394 |

OTHER PUBLICATIONS

Written Opinion dated Sep. 29, 2021 from the International Bureau in International Application No. PCT/US2021/039665.
Extended European Search Report dated Nov. 11, 2022 in European Application No. 21867303.6.

* cited by examiner

514

513

512

511

518

517

516

515

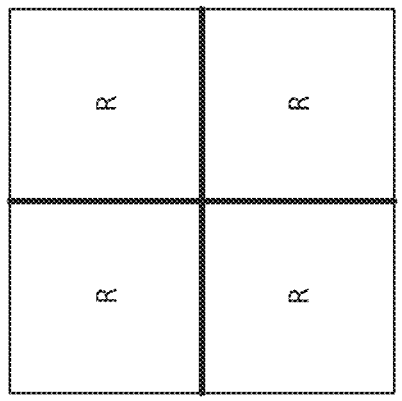
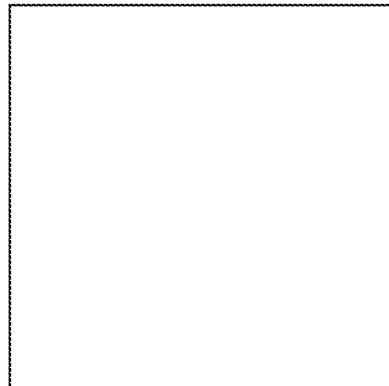

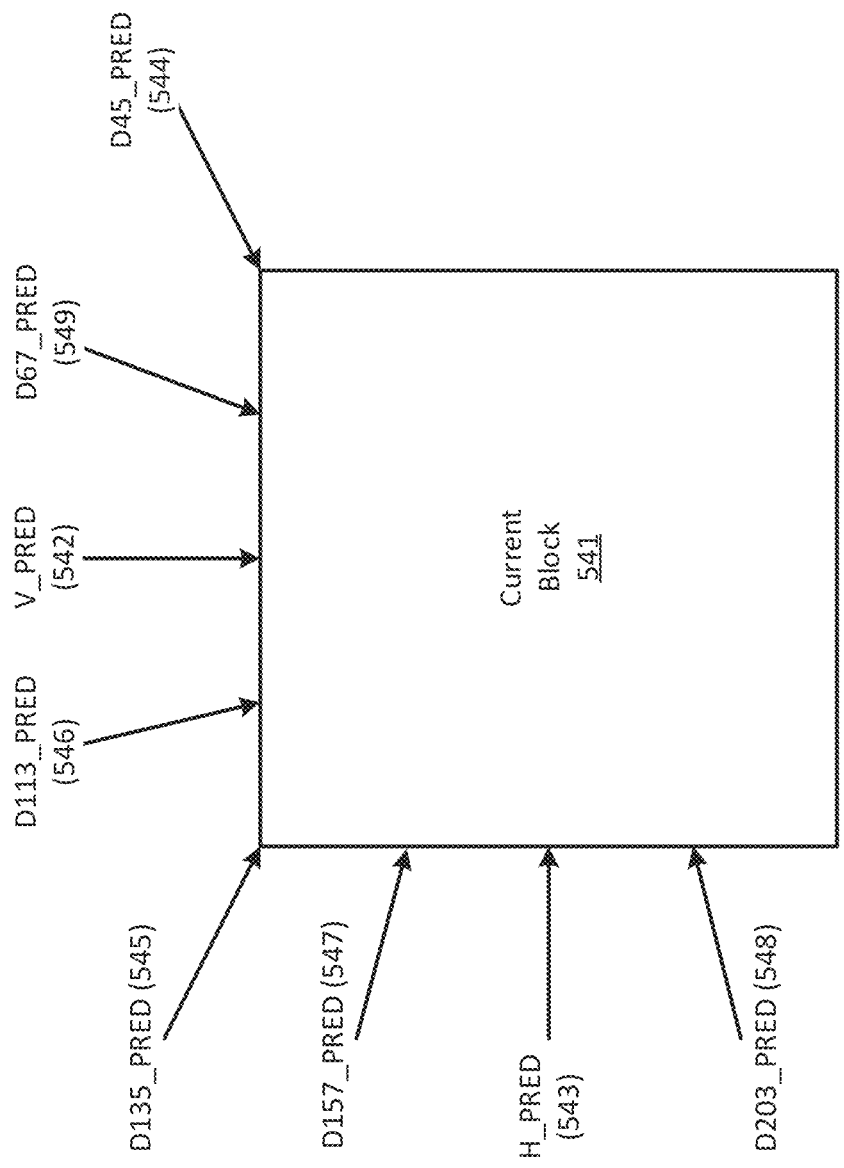

FIG. 11

| Transform Types | Description | Prediction mode | |
|---|---|---|---|
| | | Intra | Inter |
| DCT_DCT | DCT ↓ and → | ✓ (all block sizes) | ✓ (all block sizes) |
| ADST_DCT | ADST ↓, DCT → | ✓ (block size ≤ 16×16) | ✓ (block size ≤ 16×16) |
| DCT_ADST | DCT ↓, ADST → | | |
| ADST_ADST | ADST ↓ and → | | |
| FLIPADST_DCT | FLIPADST ↓, DCT → | | |
| DCT_FLIPADST | DCT ↓, FLIPADST → | | |
| FLIPADST_FLIPADST | FLIPADST ↓ and → | | |
| ADST_FLIPADST | ADST ↓, FLIPADST → | | |
| FLIPADST_ADST | FLIPADST ↓, ADST → | | |
| IDTX | IDTX ↓ and → | ✓ (block size ≤ 16×16) | ✓ (block size ≤ 32×32) |
| V_DCT | DCT ↓, IDTX → | ✓ (block size ≤ 16×16) | ✓ (block size ≤ 16×16) |
| H_DCT | IDTX ↓, DCT → | | |
| V_ADST | ADST ↓, IDTX → | × | ✓ (block size ≤ 16×16) |
| H_ADST | IDTX ↓, ADST → | | |
| V_FLIPADST | FLIPADST ↓, IDTX → | × | ✓ (block size ≤ 16×16) |
| H_FLIPADST | IDTX ↓, FLIPADST → | | |

$$T_{R \times N} = \begin{bmatrix} t_{11} & t_{12} & t_{13} & \cdots & t_{1N} \\ t_{21} & t_{22} & t_{23} & \cdots & t_{2N} \\ \vdots & & \vdots & \ddots & \vdots \\ t_{R1} & t_{R2} & t_{R3} & \cdots & t_{RN} \end{bmatrix}$$

| intra mode | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|
| set | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
| intra mode | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 (LM) |
| set | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | NULL |

720

740

710

730

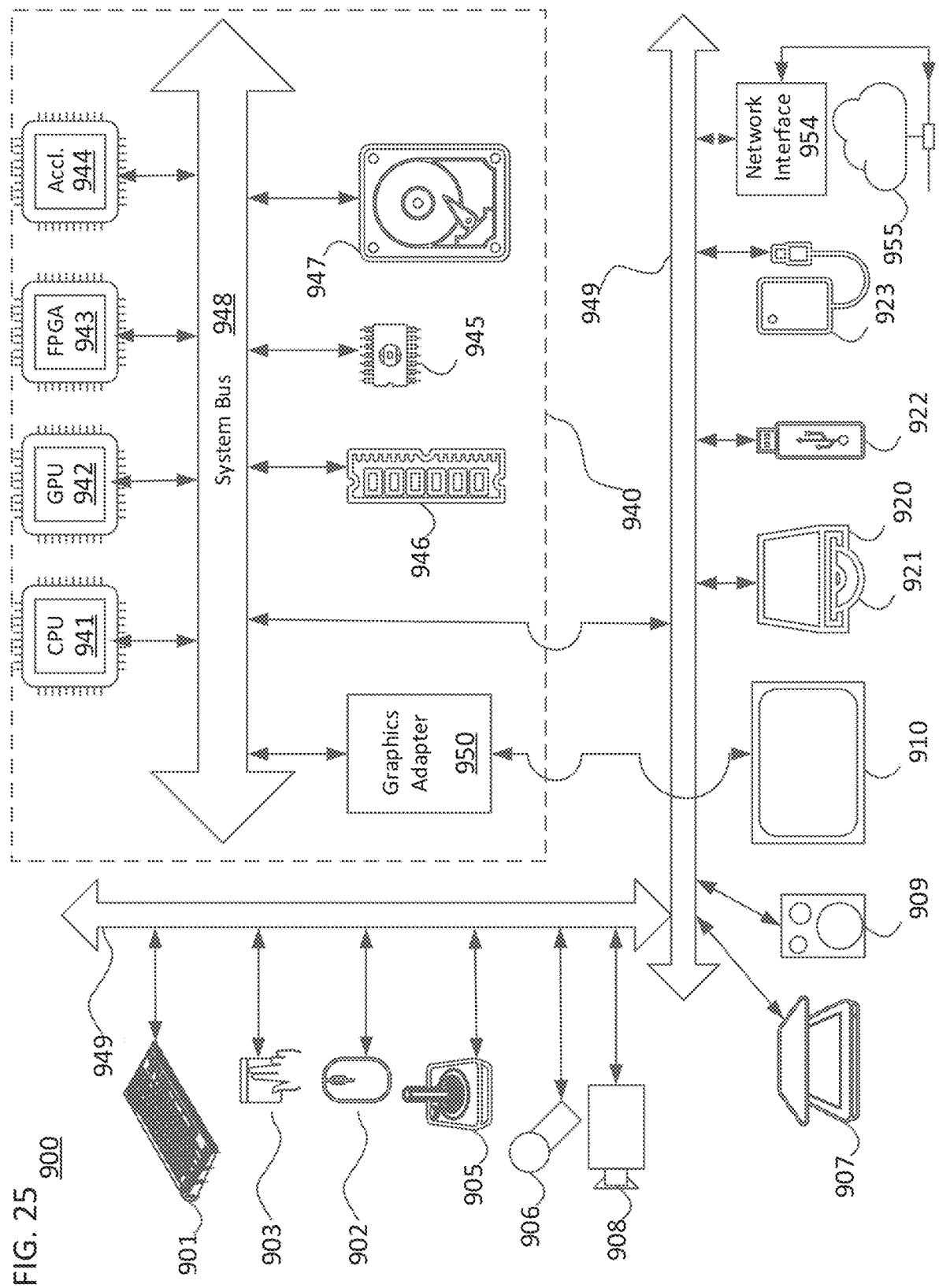

CONTEXT ADAPTIVE TRANSFORM SET

CROSS-REFERENCE TO RELATED APPLICATIONS

This application claims priority from U.S. Provisional Application No. 63/076,817, filed on Sep. 10, 2020, and U.S. Provisional Application No. 63/077,381, filed on Sep. 11, 2020, the disclosures of which are incorporated herein by reference in their entirety.

FIELD

Embodiments of the present disclosure relate to a set of advanced video coding technologies and, more specifically, primary and secondary transform set selection schemes.

BACKGROUND

AOMedia Video 1 (AV1) is an open video coding format designed for video transmissions over the Internet. It was developed as a successor to VP9 by the Alliance for Open Media (AOMedia), a consortium founded in 2015 that includes semiconductor firms, video on demand providers, video content producers, software development companies and web browser vendors. Many of the components of the AV1 project were sourced from previous research efforts by Alliance members. Individual contributors started experimental technology platforms years before: Xiph's/Mozilla's Daala published code in 2010, Google's experimental VP9 evolution project VP10 was announced on Sep. 12, 2014, and Cisco's Thor was published on Aug. 11, 2015. Building on the codebase of VP9, AV1 incorporates additional techniques, several of which were developed in these experimental formats. The first version, version 0.1.0, of the AV1 reference codec was published on Apr. 7, 2016. The Alliance announced the release of the AV1 bitstream specification on Mar. 28, 2018, along with a reference, software-based encoder and decoder. On Jun. 25, 2018, a validated version 1.0.0 of the specification was released. On Jan. 8, 2019, "AV1 Bitstream & Decoding Process Specification" was released, which is a validated version 1.0.0 with Errata 1 of the specification. The AV1 bitstream specification includes a reference video codec. The "AV1 Bitstream & Decoding Process Specification" (Version 1.0.0 with Errata 1), The Alliance for Open Media (Jan. 8, 2019), is incorporated herein in its entirety by reference.

The High Efficiency Video Coding (HEVC) standard is developed jointly by the ITU-T Video Coding Experts Group (VCEG) and the ISO/IEC Moving Picture Experts Group (MPEG) standardization organizations. To develop the HEVC standard, these two standardization organizations work together in a partnership known as the Joint Collaborative Team on Video Coding (JCT-VC). The first edition of the HEVC standard was finalized in January 2013, resulting in an aligned text that was published by both ITU-T and ISO/IEC. After that, additional work was organized to extend the standard to support several additional application scenarios, including extended-range uses with enhanced precision and color format support, scalable video coding, and 3-D/stereo/multiview video coding. In ISO/IEC, the HEVC standard became MPEG-H Part 2 (ISO/IEC 23008-2) and in ITU-T it became ITU-T Recommendation H.265. The specification for the HEVC standard, "SERIES H: AUDIO-VISUAL AND MULTIMEDIA SYSTEMS, Infrastructure of audiovisual services—Coding of moving video", ITU-T H.265, International Telecommunication Union (April 2015), is), is incorporated herein in its entirety by reference.

ITU-T VCEG (Q6/16) and ISO/IEC MPEG (JTC 1/SC 29/WG 11) published the H.265/HEVC (High Efficiency Video Coding) standard in 2013 (version 1), 2014 (version 2), 2015 (version 3), and 2016 (version 4). Since then, they have been studying the potential need for standardization of future video coding technology which could significantly outperform HEVC in compression capability. In October 2017, they issued the Joint Call for Proposals on Video Compression with Capability beyond HEVC (CfP). By Feb. 15, 2018, 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/$10^{th}$ Joint Video Exploration Team—Joint Video Expert Team (JVET) meeting. With careful evaluation, JVET formally launched the standardization of next-generation video coding beyond HEVC, i.e., the so-called Versatile Video Coding (VVC). A specification for the VVC standard, "Versatile Video Coding (Draft 7)", JVET-P2001-vE, Joint Video Experts Team (October 2019), is incorporated herein in its entirety by reference. Another specification for the VVC standard, "Versatile Video Coding (Draft 10)", JVET-S2001-vE, Joint Video Experts Team (July 2020), is incorporated herein in its entirety by reference.

SUMMARY

According to embodiments, primary and secondary transform set selection schemes using neighboring reconstructed samples is provided. According to embodiments, neural network-based transform set selection scheme for image and video compression is provided.

According to one or more embodiments, a method performed by at least one processor is provided. The method includes receiving a coded bitstream, and decoding a block of a picture from the coded bitstream. The decoding including: selecting a transform set based on at least one neighboring reconstructed sample from one or more previously decoded neighboring blocks or from a previously decoded picture; and inverse transforming coefficients of the block using a transform from the transform set.

According to one or more embodiments, the selecting the transform set is further based on coded information of a prediction mode.

According to an embodiment, the coded information is of an inter prediction mode.

According to an embodiment, the selecting the transform set includes: selecting a sub-group of transform sets from a group of transform sets based on first coded information; and selecting the transform set from the sub-group.

According to an embodiment, the selecting the transform set from the sub-group includes selecting the transform set based on second coded information, and the method further includes selecting a transform candidate from the transform set based on an index value signaled in the coded bitstream.

According to an embodiment, the at least one neighboring reconstructed sample includes a reconstructed sample from the one or more previously decoded neighboring blocks.

According to an embodiment, the selecting the transform set includes selecting the transform set from a group of transform sets, and the group of transform sets includes only secondary transform kernels.

According to an embodiment, the second transform kernels are non-separable.

According to an embodiment, the selecting the transform set is performed by inputting information of the least one neighboring reconstructed sample into a neural network, and identifying the transform set based on an index that is output from the neural network.

According to an embodiment, the transform set is a secondary transform.

According to one or more embodiments, a system is provided. The system includes: at least one memory configured to store computer program code; and at least one processor configured to access the computer program code and operate as instructed by the computer program code. The computer program code includes decoding code that is configured to cause the at least one processor to decode a block of a picture from a coded bitstream that is received. The decoding code includes: transform set selecting code configured to cause the at least one processor to select a transform set based on at least one neighboring reconstructed sample from one or more previously decoded neighboring blocks or from a previously decoded picture; and transforming code configured to cause the at least one processor to inverse transform coefficients of the block using a transform from the transform set.

According to an embodiment, the transform set is selected further based on coded information of a prediction mode.

According to an embodiment, the coded information is of an inter prediction mode.

According to an embodiment, the transform set selecting code is configured to cause the at least one processor to: select a sub-group of transform sets from a group of transform sets based on first coded information; and select the transform set from the sub-group.

According to an embodiment, the transform set selecting code is configured to cause the at least one processor to select the transform set based on second coded information, and the decoding code further includes transform selecting code configured to cause the at least one processor to select a transform candidate from the transform set based on an index value signaled in the coded bitstream.

According to an embodiment, the at least one neighboring reconstructed sample includes a reconstructed sample from the one or more previously decoded neighboring blocks.

According to an embodiment, the transform set selecting code is configured to select the transform set from a group of transform sets, and the group of transform sets includes only secondary transform kernels.

According to an embodiment, the second transform kernels are non-separable.

According to an embodiment, the transform set selecting code is configured to cause the at least one processor to input information of the least one neighboring reconstructed sample into a neural network, and identify the transform set based on an index that is output from the neural network.

According to one or more embodiments, a non-transitory computer-readable medium storing computer instructions is provided. The computer instructions are configured to, when executed by at least one processor, cause the at least one processor to decode a block of a picture from a received coded bitstream by: selecting a transform set based on at least one neighboring reconstructed sample from one or more previously decoded neighboring blocks or from a previously decoded picture; and inverse transforming coefficients of the block using a transform from the transform set.

BRIEF DESCRIPTION OF THE DRAWINGS

Further features, the nature, and various advantages of the disclosed subject matter will be more apparent from the following detailed description and the accompanying drawings in which:

FIG. 6I a diagram illustrating a ninth example partition structure of AV1.

FIG. 6J a diagram illustrating a tenth example partition structure of AV1.

FIG. 7 is a diagram illustrating eight nominal angles in AV1.

FIG. 11 is a table of AV1 hybrid transform kernels and their availabilities.

FIG. 13 is an illustration of a matrix.

FIG. 22 is a table of mapping from intra prediction mode to transform set index.

FIG. 25 is a diagram of a computer system suitable for implementing embodiments of the present disclosure.

DETAILED DESCRIPTION

In the present disclosure, the term "block" may be interpreted as a prediction block, a coding block, or a coding unit (CU). The term "block" here may also be used to refer to a transform block.

In the present disclosure, the term "transform set" refers to a group of transform kernel (or candidates) options. A transform set may include one or more transform kernel (or candidates) options. According to embodiments of the present disclosure, when more than one transform options are available, an index may be signaled to indicate which one of the transform options in the transform set is applied for the current block.

In the present disclosure, the term "prediction mode set" refers to a group of prediction mode options. A prediction mode set may include one or more prediction mode options. According to embodiments of the present disclosure, when more than one prediction mode options are available, an index may be further signaled to indicate which one of the prediction mode options in the prediction mode set is applied for the current block for performing the prediction.

In the present disclosure, the term "neighboring reconstructed samples set" refers to a group of reconstructed samples from previously decoded neighboring blocks or reconstructed samples in a previously decoded picture.

In the present disclosure, the term "neural network" refers to a general concept of data processing structure with one or multiple layers, as described herein with reference to "deep learning for video coding." According to embodiments of the present disclosure, any neural network may be configured to implement the embodiments.

Figure 1:
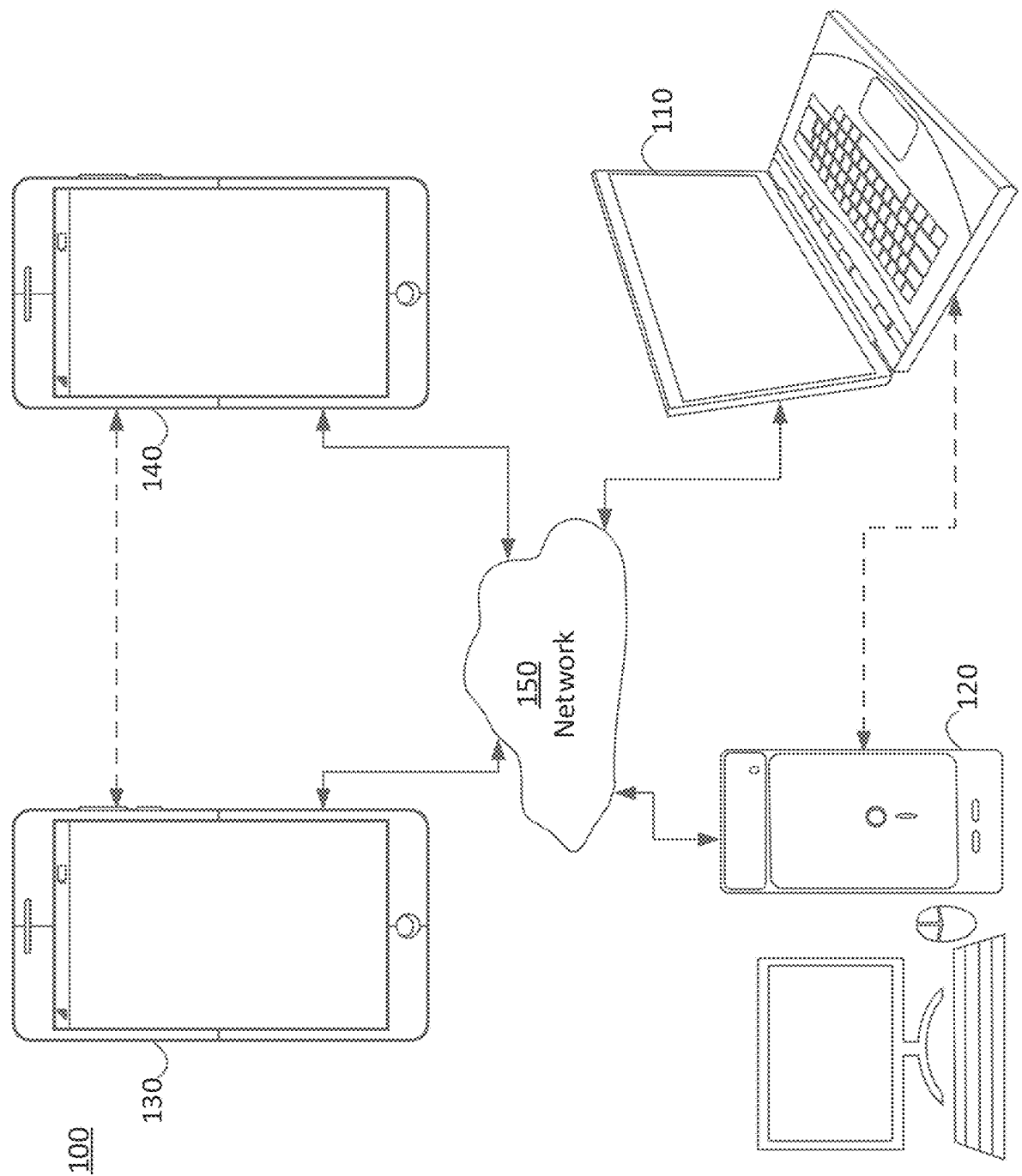
FIG. 1 is a schematic illustration of a simplified block diagram of a communication system in accordance with an embodiment.

FIG. 1 illustrates a simplified block diagram of a communication system (100) according to an embodiment of the present disclosure. The system (100) may include at least two terminals (110, 120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data, and may display the recovered video data at a local display device.

In FIG. 1, the terminals (110-140) may be illustrated as servers, personal computers, and smart phones, and/or any other type of terminal. For example, the terminals (110-140) may be laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks, and/or the Internet. For the purposes of the present discussion, the architecture and topology of the network (150) may be immaterial to the operation of the present disclosure unless explained herein below.

Figure 2:
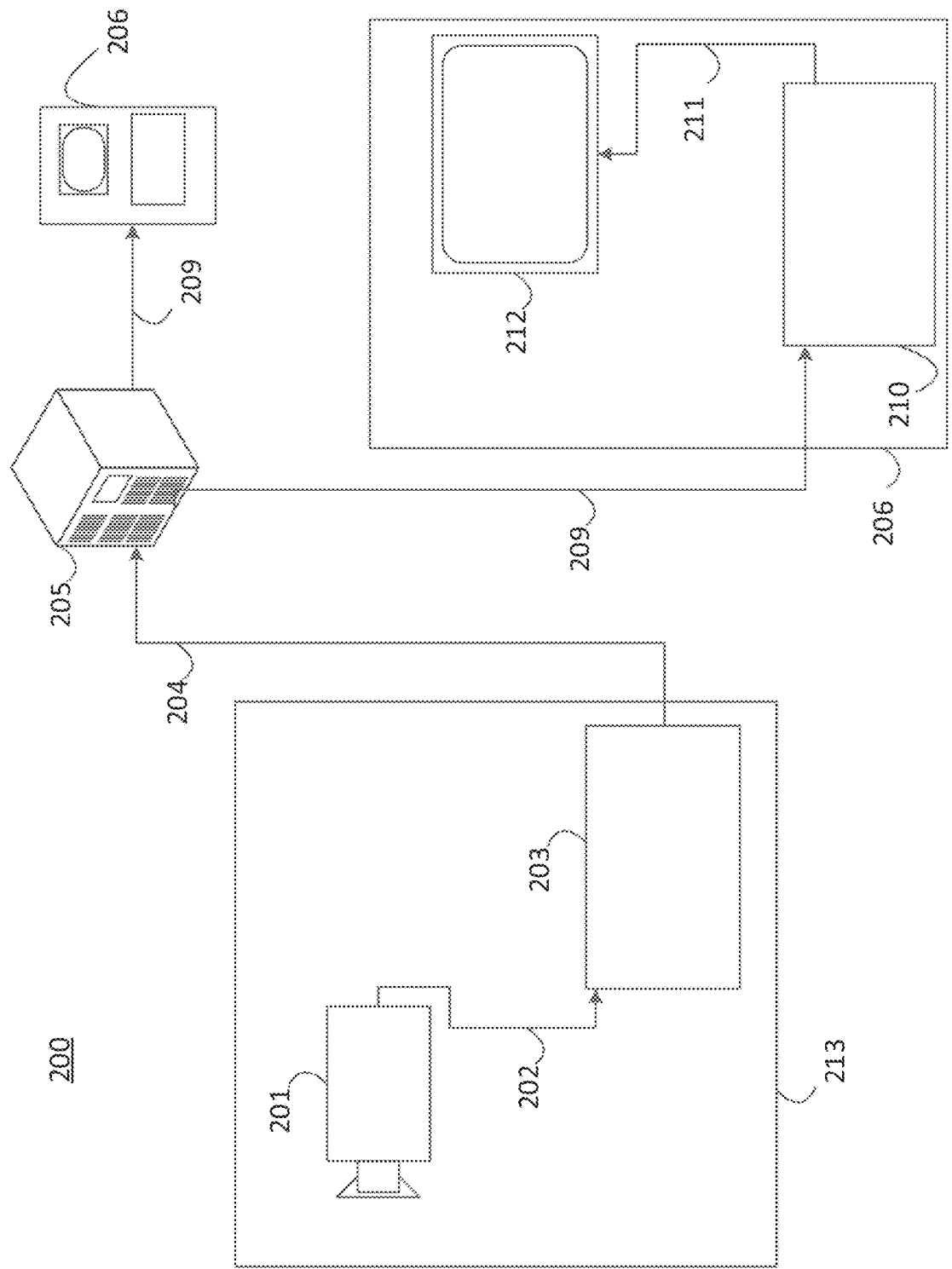
FIG. 2 is a schematic illustration of a simplified block diagram of a communication system in accordance with an embodiment.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

As illustrated in FIG. 2, a streaming system (200) may include a capture subsystem (213) that can include a video source (201) and an encoder (203). The video source (201) may be, for example, a digital camera, and may be configured to create an uncompressed video sample stream (202). The uncompressed video sample stream (202) may provide a high data volume when compared to encoded video bitstreams, and can be processed by the encoder (203) coupled to the camera (201). The encoder (203) can include hardware, software, or a combination thereof to enable or implement aspects of the disclosed subject matter as described in more detail below. The encoded video bitstream (204) may include a lower data volume when compared to the sample stream, and can be stored on a streaming server (205) for future use. One or more streaming clients (206) can access the streaming server (205) to retrieve video bit streams (209) that may be copies of the encoded video bitstream (204).

In embodiments, the streaming server (205) may also function as a Media-Aware Network Element (MANE). For example, the streaming server (205) may be configured to prune the encoded video bitstream (204) for tailoring potentially different bitstreams to one or more of the streaming clients (206). In embodiments, a MANE may be separately provided from the streaming server (205) in the streaming system (200).

The streaming clients (206) can include a video decoder (210) and a display (212). The video decoder (210) can, for example, decode video bitstream (209), which is an incoming copy of the encoded video bitstream (204), and create an outgoing video sample stream (211) that can be rendered on the display (212) or another rendering device (not depicted). In some streaming systems, the video bitstreams (204, 209) can be encoded according to certain video coding/compression standards. Examples of such standards include, but are not limited to, ITU-T Recommendation H.265. Under development is a video coding standard informally known as Versatile Video Coding (VVC). Embodiments of the disclosure may be used in the context of VVC.

Figure 3:
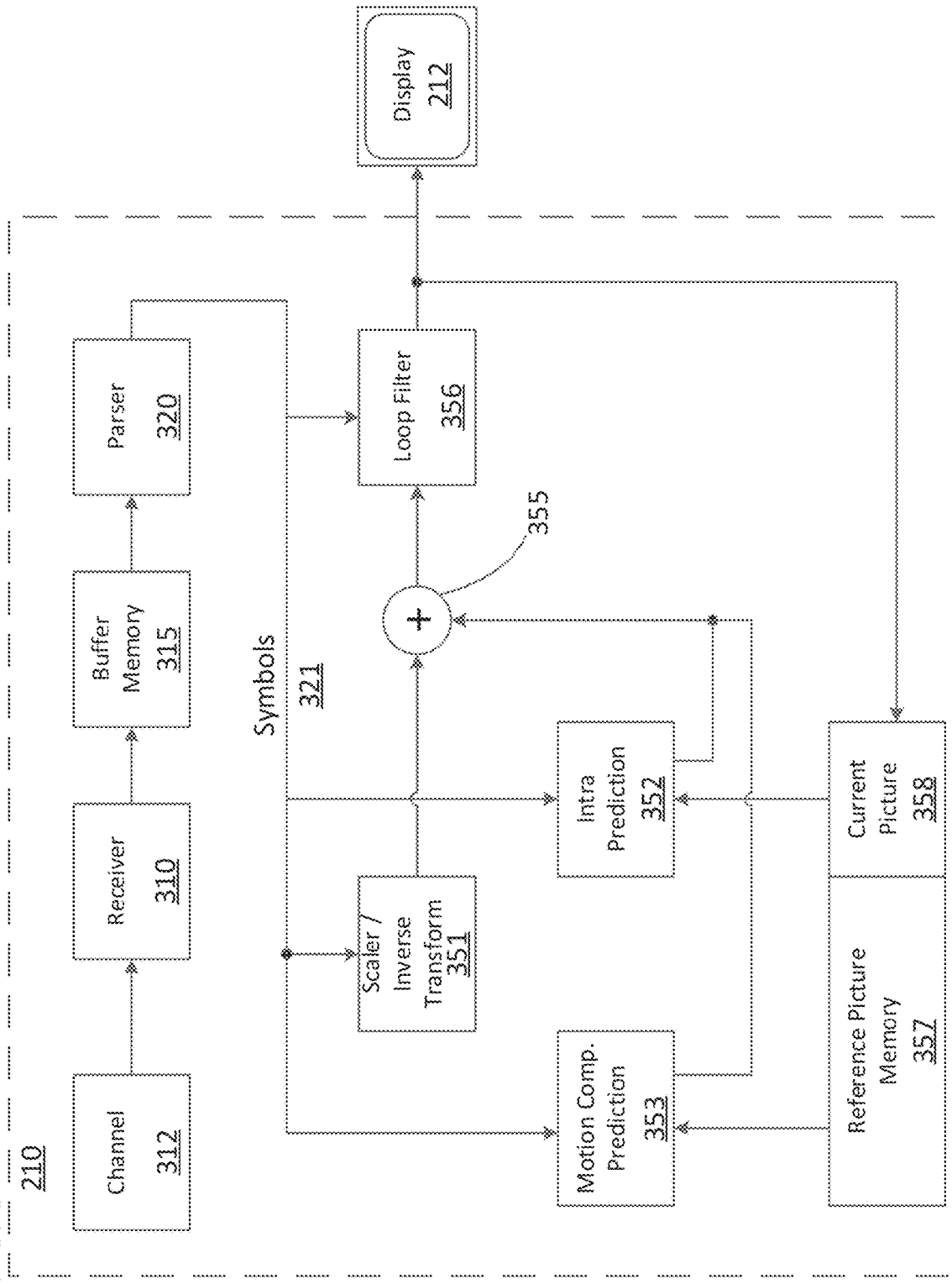
FIG. 3 is a schematic illustration of a simplified block diagram of a decoder in accordance with an embodiment.

FIG. 3 illustrates an example functional block diagram of a video decoder (210) that is attached to a display (212) according to an embodiment of the present disclosure.

The video decoder (210) may include a channel (312), receiver (310), a buffer memory (315), an entropy decoder/parser (320), a scaler/inverse transform unit (351), an intra prediction unit (352), a Motion Compensation Prediction unit (353), an aggregator (355), a loop filter unit (356), reference picture memory (357), and current picture memory( ). In at least one embodiment, the video decoder (210) may include an integrated circuit, a series of integrated circuits, and/or other electronic circuitry. The video decoder (210) may also be partially or entirely embodied in software running on one or more CPUs with associated memories.

In this embodiment, and other embodiments, the receiver (310) may receive one or more coded video sequences to be decoded by the decoder (210) one coded video sequence at a time, where the decoding of each coded video sequence is independent from other coded video sequences. The coded video sequence may be received from the channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, the buffer memory (315) may be coupled in between the receiver (310) and the entropy decoder/parser (320) ("parser" henceforth). When the receiver (310) is receiving data from a store/forward device of sufficient bandwidth and controllability, or from an isosynchronous network, the buffer (315) may not be used, or can be small. For use on best effort packet networks such as the Internet, the buffer (315) may be required, can be comparatively large, and can be of adaptive size.

The video decoder (210) may include a parser (320) to reconstruct symbols (321) from the entropy coded video sequence. Categories of those symbols include, for example, information used to manage operation of the decoder (210), and potentially information to control a rendering device such as a display (212) that may be coupled to a decoder as illustrated in FIG. 2. The control information for the rendering device(s) may be in the form of, for example, Supplementary Enhancement Information (SEI) messages or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform entropy decoding/parsing operation on the video sequence received from the buffer (315), so to create symbols (321).

Reconstruction of the symbols (321) can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser (320). The flow of such subgroup control information between the parser (320) and the multiple units below is not depicted for clarity.

Beyond the functional blocks already mentioned, decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

One unit may be the scaler/inverse transform unit (351). The scaler/inverse transform unit (351) may receive quantized transform coefficient as well as control information, including which transform to use, block size, quantization factor, quantization scaling matrices, etc. as symbol(s) (321) from the parser (320). The scaler/inverse transform unit (351) can output blocks including sample values that can be input into the aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture from the current picture memory (358). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a Motion Compensation Prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so to generate output sample information. The addresses within the reference picture memory (357), from which the Motion Compensation Prediction unit (353) fetches prediction samples, can be controlled by motion vectors. The motion vectors may be available to the Motion Compensation Prediction unit (353) in the form of symbols (321) that can have, for example, X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to a render device such as a display (212), as well as stored in the reference picture memory (357) for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture can become part of the reference picture memory (357), and a fresh current picture memory can be reallocated before commencing the reconstruction of the following coded picture.

The video decoder (210) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
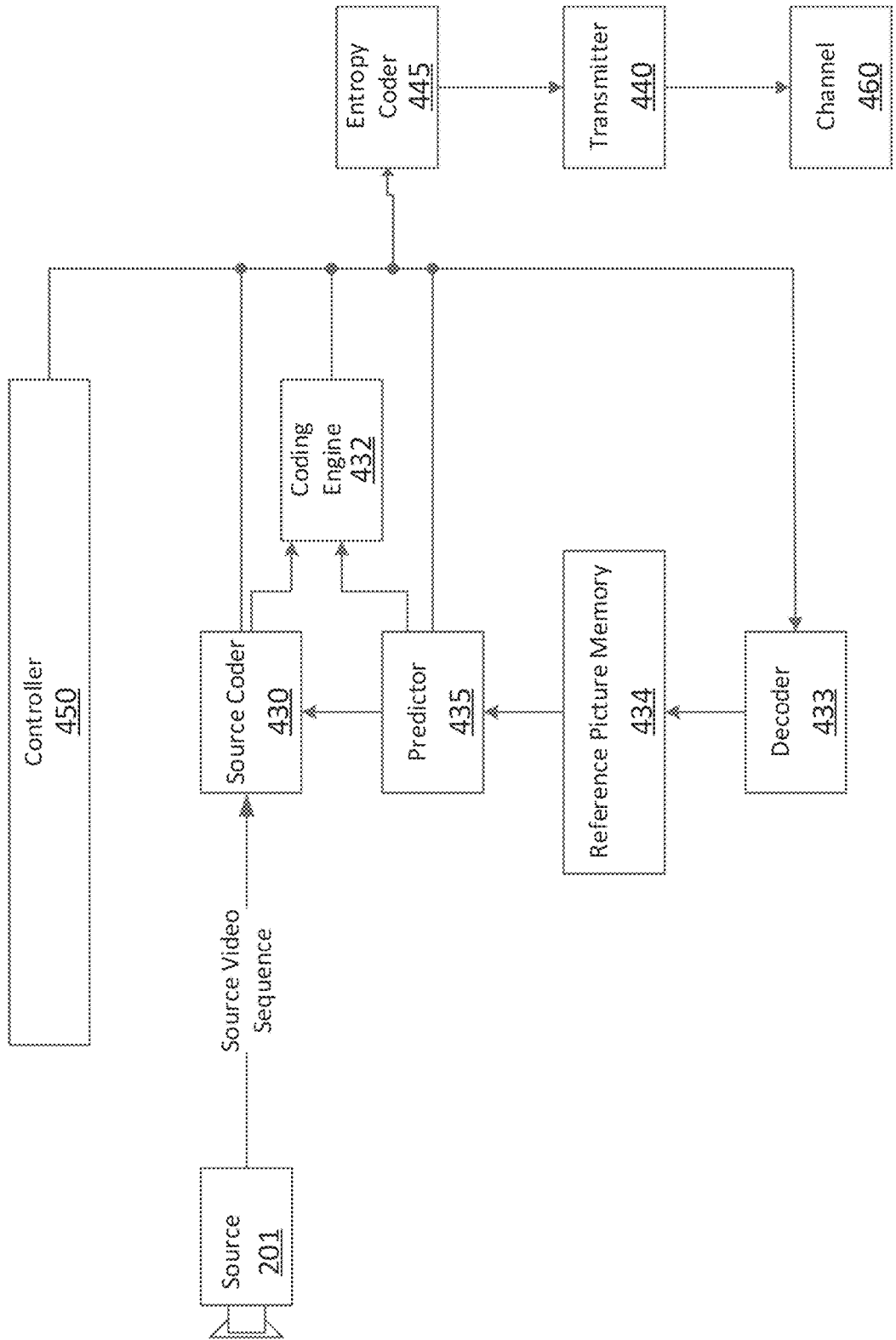
FIG. 4 is a schematic illustration of a simplified block diagram of an encoder in accordance with an embodiment.
Figure 5A:
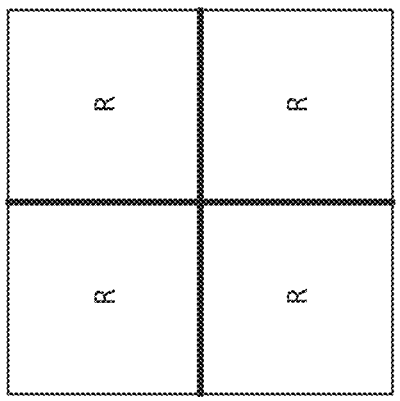
FIG. 5A a diagram illustrating a first example partition structure of VP9.
Figure 5B:
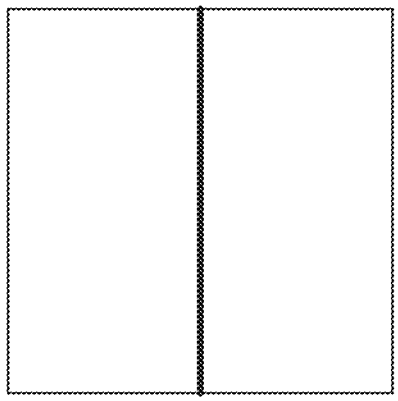
FIG. 5B a diagram illustrating a second example partition structure of VP9.
Figure 5C:
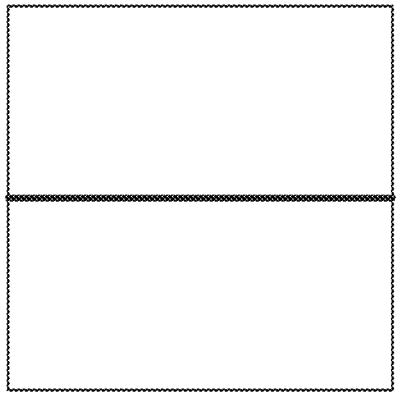
FIG. 5C a diagram illustrating a third example partition structure of VP9.
Figure 5D:
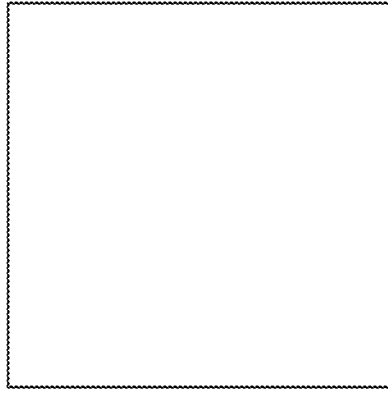
FIG. 5D a diagram illustrating a fourth example partition structure of VP9.
Figure 6D:
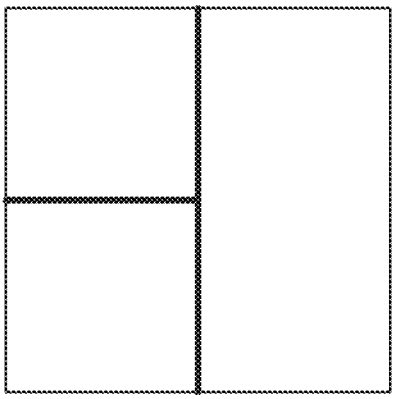
FIG. 6D a diagram illustrating a fourth example partition structure of AV1.
Figure 6C:
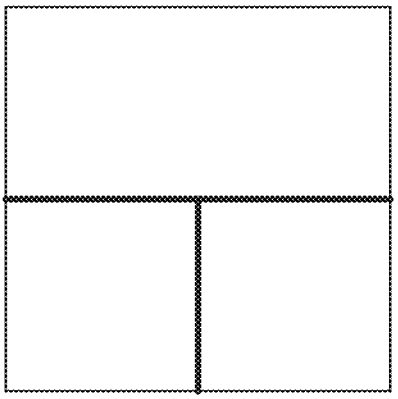
FIG. 6C a diagram illustrating a third example partition structure of AV1.
Figure 6B:
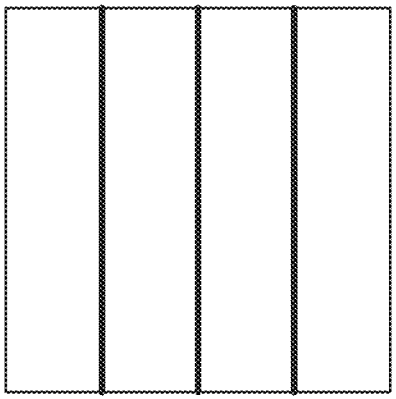
FIG. 6B a diagram illustrating a second example partition structure of AV1.
Figure 6A:
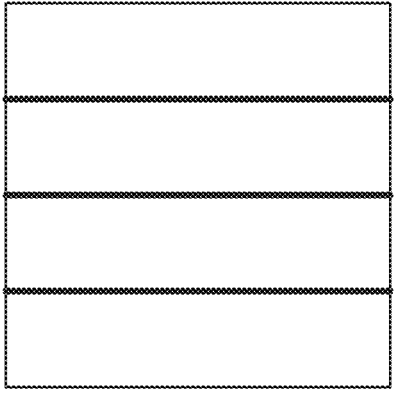
FIG. 6A a diagram illustrating a first example partition structure of AV1.
Figure 6H:
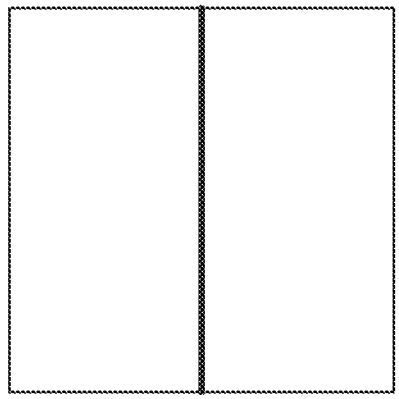
FIG. 6H a diagram illustrating an eighth example partition structure of AV1.
Figure 6G:
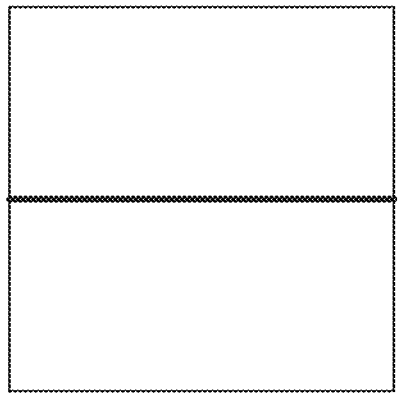
FIG. 6G a diagram illustrating a seventh example partition structure of AV1.
Figure 6F:
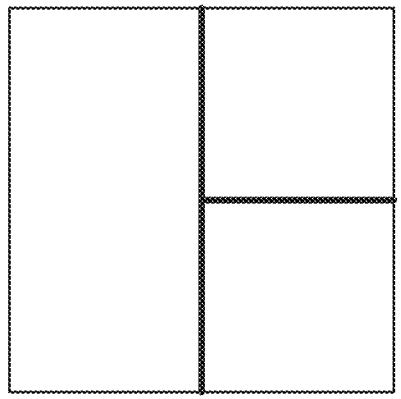
FIG. 6F a diagram illustrating a sixth example partition structure of AV1.
Figure 6E:
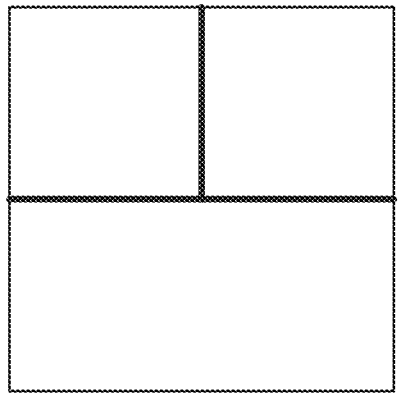
FIG. 6E a diagram illustrating a fifth example partition structure of AV1.

FIG. 4 illustrates an example functional block diagram of a video encoder (203) associated with a video source (201) according to an embodiment of the present disclosure.

The video encoder (203) may include, for example, an encoder that is a source coder (430), a coding engine (432), a (local) decoder (433), a reference picture memory (434), a predictor (435), a transmitter (440), an entropy coder (445), a controller (450), and a channel (460).

The encoder (203) may receive video samples from a video source (201) (that is not part of the encoder) that may capture video image(s) to be coded by the encoder (203).

The video source (201) may provide the source video sequence to be coded by the encoder (203) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (203) may be a camera that captures local image information as a video sequence. Video data may be provided as a plurality of individual pictures that impart motion when viewed in sequence. The pictures themselves may be organized as a spatial array of pixels, wherein each pixel can include one or more sample depending on the sampling structure, color space, etc. in use. A person skilled in the art can readily understand the relationship between pixels and samples. The description below focuses on samples.

According to an embodiment, the encoder (203) may code and compress the pictures of the source video sequence into a coded video sequence (443) in real time or under any other time constraints as required by the application. Enforcing appropriate coding speed is one function of controller (450). The controller (450) may also control other functional units as described below and may be functionally coupled to these units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (450) as they may pertain to video encoder (203) optimized for a certain system design.

Some video encoders operate in what a person skilled in the are readily recognizes as a "coding loop". As an oversimplified description, a coding loop can consist of the encoding part of the source coder (430) (responsible for creating symbols based on an input picture to be coded, and a reference picture(s)), and the (local) decoder (433) embedded in the encoder (203) that reconstructs the symbols to create the sample data that a (remote) decoder also would create when a compression between symbols and coded video bitstream is lossless in certain video compression technologies. That reconstructed sample stream may be input to the reference picture memory (434). As the decoding of a symbol stream leads to bit-exact results independent of decoder location (local or remote), the reference picture memory content is also bit exact between a local encoder and a remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is known to a person skilled in the art.

The operation of the "local" decoder (433) can be the same as of a "remote" decoder (210), which has already been described in detail above in conjunction with FIG. 3. However, as symbols are available and en/decoding of symbols to a coded video sequence by the entropy coder (445) and the parser (320) can be lossless, the entropy decoding parts of decoder (210), including channel (312), receiver (310), buffer (315), and parser (320) may not be fully implemented in the local decoder (433).

An observation that can be made at this point is that any decoder technology, except the parsing/entropy decoding that is present in a decoder, may need to be present, in substantially identical functional form in a corresponding encoder. For this reason, the disclosed subject matter focuses on decoder operation. The description of encoder technologies can be abbreviated as they may be the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture memory (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data.

Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as an Intra Picture (I picture), a Predictive Picture (P picture), or a Bi-directionally Predictive Picture (B Picture).

An Intra Picture (I picture) may be one that may be coded and decoded without using any other frame in the sequence as a source of prediction. Some video codecs allow for different types of Intra pictures, including, for example Independent Decoder Refresh (IDR) Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

[Coding Block Partition in VP9 and AV1}

With reference to partition structures (502)-(508) of FIGS. 5A-D, VP9 uses a 4-way partition tree starting from the 64×64 level down to 4×4 level, with some additional restrictions for blocks 8×8. Note that partitions designated as R in FIG. 5D refer to recursion in that the same partition tree is repeated at a lower scale until the lowest 4×4 level is reached.

With reference to partition structures (511)-(520) of FIGS. 6A-J, AV1 not only expands the partition-tree to a 10-way structure, but also increases the largest size (referred to as superblock in VP9/AV1 parlance) to start from 128×128. Note that this includes 4:1/1:4 rectangular partitions that did not exist in VP9. The partition types with 3 sub-partitions as shown in FIGS. 6C-F is called a "T-type" partition. None of the rectangular partitions may be further subdivided. In addition to coding block size, coding tree depth may be defined to indicate the splitting depth from the root note. To be specific, the coding tree depth for the root node, e.g. 128×128, is set to 0, and after tree block is further split once, the coding tree depth is increased by 1.

Instead of enforcing fixed transform unit sizes as in VP9, AV1 allows luma coding blocks to be partitioned into transform units of multiple sizes that can be represented by a recursive partition going down by up to 2 levels. To incorporate AV1's extended coding block partitions, square, 2:1/1:2, and 4:1/1:4 transform sizes from 4×4 to 64×64 may be supported. For chroma blocks, only the largest possible transform units may be allowed.

[Block Partitioning in HEVC]

In HEVC, a coding tree unit (CTU) may be split into coding units (CUs) by using a quadtree (QT) structure denoted as a coding tree to adapt to various local characteristics. The decision on whether to code a picture area using inter-picture (temporal) or intra-picture (spatial) prediction may be made at the CU level. Each CU can be further split into one, two, or four prediction units (PUs) according to the PU splitting type. Inside one PU, the same prediction process may be applied and the relevant information is transmitted to the decoder on a PU basis. After obtaining the residual block by applying the prediction process based on the PU splitting type, a CU can be partitioned into transform units (TUs) according to another quad tree structure like the coding tree for the CU. One of key features of the HEVC structure is that it has the multiple partition concepts including CU, PU, and TU. In HEVC, a CU or a TU can only have a square shape, while a PU may have a square or rectangular shape for an inter predicted block. In HEVC, one coding block may be further split into four square sub-blocks, and transform is performed on each sub-block (i.e. TU). Each TU can be further split recursively (using quadtree split) into smaller TUs, which is called a Residual Quad-Tree (RQT).

At picture boundary, HEVC employs implicit quad-tree split so that a block will keep quad-tree splitting until the size fits the picture boundary.

[Quadtree with Nested Multi-Type Tree Coding Block Structure in VVC]

In VVC, a quadtree with nested multi-type tree using binary and ternary splits segmentation structure replaces the concepts of multiple partition unit types. That is, VVC does not include the separation of the CU, PU, and TU concepts except as needed for CUs that have a size too large for the maximum transform length, and supports more flexibility for CU partition shapes. In the coding tree structure, a CU can have either a square or rectangular shape. A coding tree unit (CTU) is first partitioned by a quaternary tree (a.k.a. quad tree) structure. Then, the quaternary tree leaf nodes can be further partitioned by a multi-type tree structure. There are four splitting types in multi-type tree structure: vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes may be called coding units (CUs), and unless the CU is too large for the maximum transform length, this segmentation may be used for prediction and transform processing without any further partitioning. This means that, in most cases, the CU, PU and TU have the same block size in the quadtree with nested multi-type tree coding block structure. The exception occurs when maximum supported transform length is smaller than the width or height of the color component of the CU. One example of block partition is that a CTU is divided into multiple CUs with a quadtree and nested multi-type tree coding block structure, with quadtree partitioning and multi-type tree partitioning. The quadtree with nested multi-type tree partition provides a content-adaptive coding tree structure comprised of CUs.

In VVC, the maximum supported luma transform size is 64×64 and the maximum supported chroma transform size is 32×32. When the width or height of the CB is larger than the maximum transform width or height, the CB may be automatically split in the horizontal and/or vertical direction to meet the transform size restriction in that direction.

In VTM7, the coding tree scheme supports the ability for the luma and chroma to have a separate block tree structure. For P and B slices, the luma and chroma CTBs in one CTU may have to share the same coding tree structure. However, for I slices, the luma and chroma can have separate block tree structures. When separate block tree mode is applied, luma CTB is partitioned into CUs by one coding tree structure, and the chroma CTBs are partitioned into chroma CUs by another coding tree structure. This means that a CU in an I slice may consist of a coding block of the luma component or coding blocks of two chroma components, and a CU in a P or B slice may consist of coding blocks of all three colour components unless the video is monochrome.

[Directional Intra Prediction in AV1]

VP9 supports eight directional modes corresponding to angles from 45 to 207 degrees. To exploit more varieties of spatial redundancy in directional textures, in AV1, directional intra modes are extended to an angle set with finer granularity. The original eight angles are slightly changed and made as nominal angles, and these 8 nominal angles are named as V_PRED (542), H_PRED (543), D45_PRED (544), D135_PRED (545), D113_PRED (5446), D157_PRED (547), D203_PRED (548), and D67_PRED (549), which is illustrated in FIG. 7 with respect to a current block (541). For each nominal angle, there are seven finer angles, so AV1 has 56 directional angles in total. The prediction angle is presented by a nominal intra angle plus an angle delta, which is −3~3 multiples of the step size of 3 degrees. In AV1, eight nominal modes together with five non-angular smooth modes are firstly signaled. Then, if current mode is an angular mode, an index is further signaled to indicate the angle delta to the corresponding nominal angle. To implement directional prediction modes in AV1 via a generic way, all the 56 directional intra prediction mode in AV1 are implemented with a unified directional predictor that projects each pixel to a reference sub-pixel location and interpolates the reference pixel by a 2-tap bilinear filter.

[Non-Directional Smooth Intra Predictors in AV1]

Figure 8:
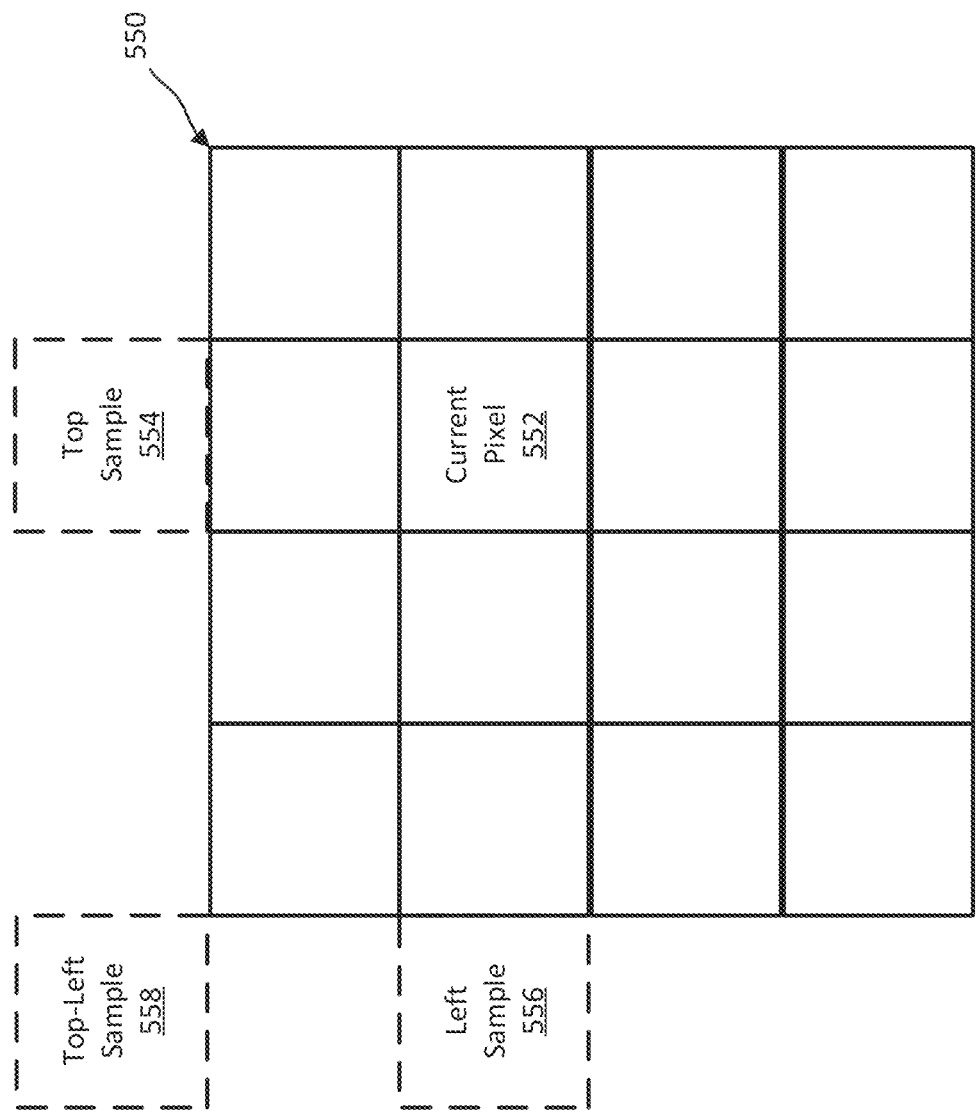
FIG. 8 is a diagram illustrating a current block and samples.

In AV1, there are five non-directional smooth intra prediction modes, which are DC, PAETH, SMOOTH, SMOOTH_V, and SMOOTH_H. For DC prediction, the average of left and above neighboring samples is used as the predictor of the block to be predicted. For PAETH predictor, top, left, and top-left reference samples are firstly fetched, and then the value which is closest to (top+left−topleft) is set as the predictor for the pixel to be predicted. FIG. 8 illustrates the positions of a top sample (554), a left sample (556), and a top-left sample (558) for a pixel (552) in a current block (550). For SMOOTH, SMOOTH_V, and SMOOTH_H modes, the current block (550) is predicted using quadratic interpolation in vertical or horizontal directions, or the average of both directions.

[Recursive Filtering Based Intra Predictor]

Figure 9:
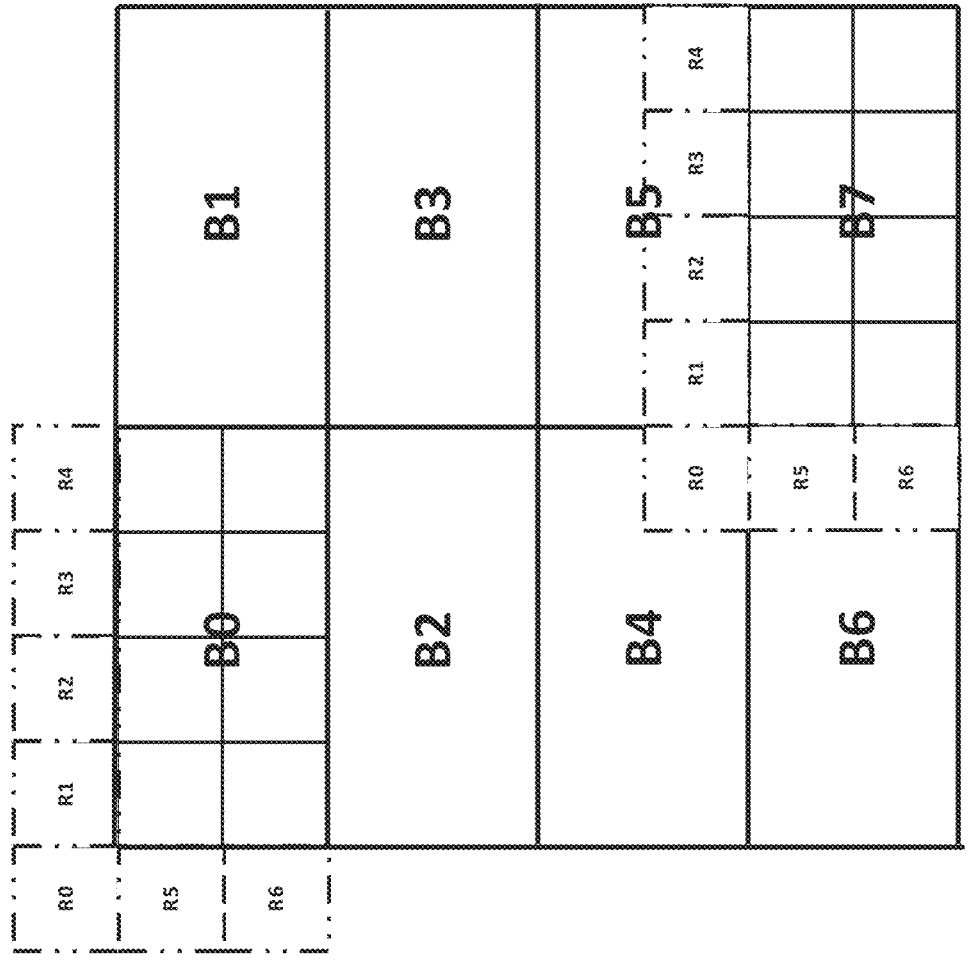
FIG. 9 is a diagram illustrating example recursive intra filtering modes.

To capture decaying spatial correlation with references on the edges, filter intra modes are designed for luma blocks. Five filter intra modes are defined for AV1, each represented by a set of eight 7-tap filters reflecting a correlation between pixels in a 4×2 patch and seven neighbors adjacent to it. In other words, the weighting factors for 7-tap filter are position dependent. For example, an 8×8 block (560) may be split into 84×2 patches as shown in FIG. 9. These patches are indicated as B0, B1, B2, B3, B4, B5, B6, and B7 in FIG. 9. For each patch, its 7 neighbors, indicated by R0-R6, may be used to predict the pixels in a current patch. For patch B0, all the neighbors may already be reconstructed. But for other patches, some of the neighbors may not be reconstructed, then the predicted values of immediate neighbors are used as the reference. For example, all of the neighbors of patch B7 are not reconstructed, so the prediction samples of neighbors are used instead.

[Chroma Predicted from Luma]

Chroma from Luma (CfL) is a chroma-only intra predictor that models chroma pixels as a linear function of coincident reconstructed luma pixels. The CfL prediction may be expressed as shown below in Equation (1):

$$CfL(\alpha) = \alpha \times L^{AC} + DC \quad \text{(Eq. 1)}$$

wherein $L^{AC}$ denotes the AC contribution of luma component, a denotes the parameter of the linear model, and DC denotes the DC contribution of the chroma component. To be specific, the reconstructed luma pixels are subsampled into the chroma resolution, and then the average value is subtracted to form the AC contribution. To approximate chroma AC component from the AC contribution, instead of requiring the decoder to calculate the scaling parameters as in some background art, AV1 CfL may determine the parameter a based on the original chroma pixels and signal them in the bitstream. This reduces decoder complexity and yields more precise predictions. As for the DC contribution of the chroma component, it may be computed using intra DC mode, which is sufficient for most chroma content and has mature fast implementations.

[Multi-Line Intra Prediction]

Figure 10:
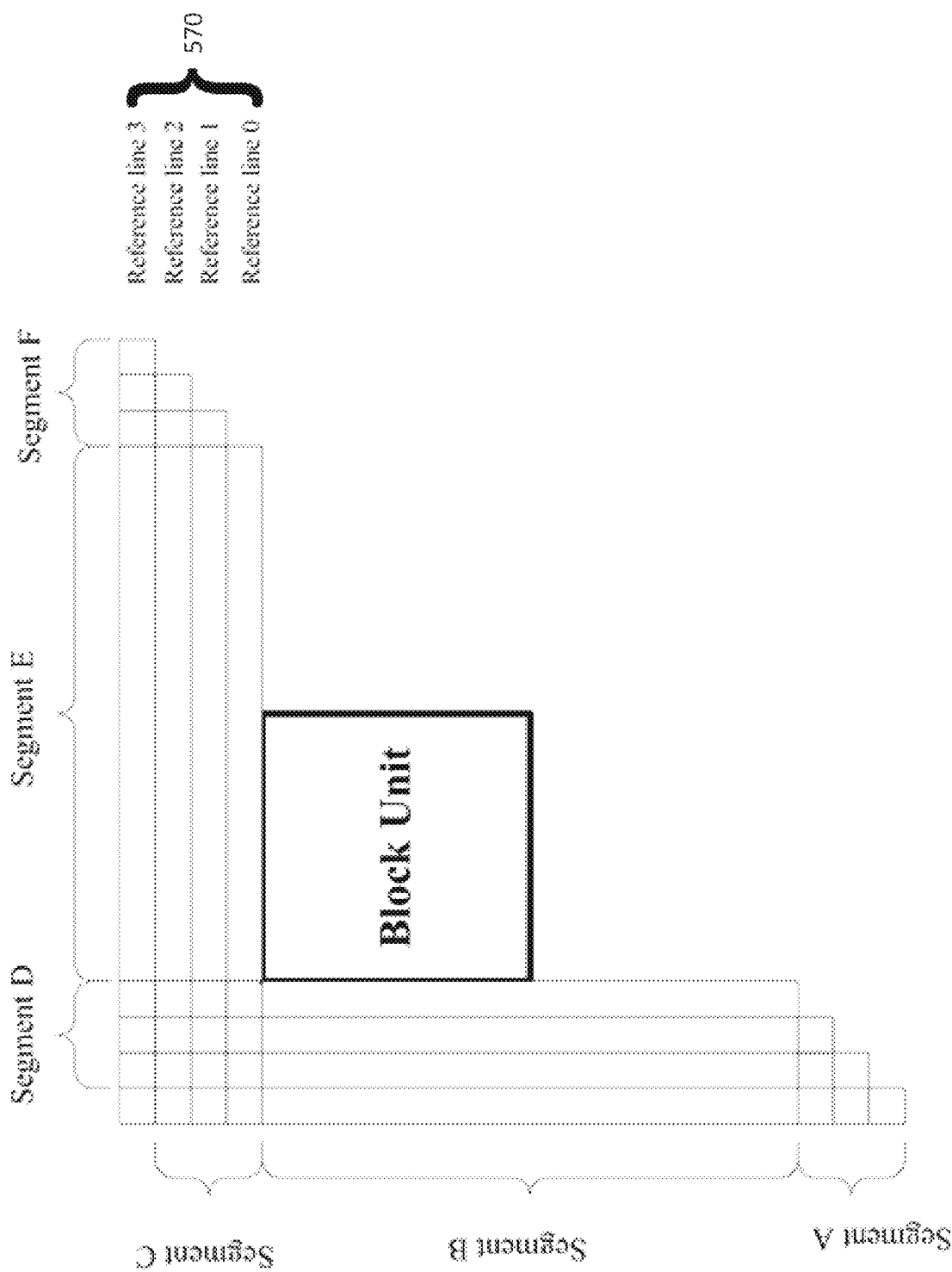
FIG. 10 is a diagram illustrating references lines adjacent to a coding block unit.

Multi-line intra prediction may use more reference lines for intra prediction, wherein an encoder decides and signals which reference line is used to generate the intra predictor. The reference line index may be signaled before intra prediction modes, and only the most probable modes may be allowed in a case where a nonzero reference line index is signaled. In FIG. 10, an example of four reference lines (570) is depicted, where each reference line (570) is composed of six segments, i.e., Segment A to F, together with the top-left reference sample. In addition, Segment A and F are padded with the closest samples from Segment B and E, respectively.

[Primary Transforms in AV1]

In order to support extended coding block partitions, multiple transform sizes (e.g. ranging from 4-point to 64-point for each dimension) and transform shapes (e.g. square; rectangular with width/height ratio's 2:1/1:2, and 4:1/1:4) are introduced in AV1.

The 2D transform process may involve the use of hybrid transform kernels (e.g. composed of different one-dimensional (1D) transforms for each dimension of the coded residual block). According to an embodiment, the primary 1D transforms are: (a) 4-point, 8-point, 16-point, 32-point, or 64-point DCT-2; (b) 4-point, 8-point, or 16-point asymmetric DST's (DST-4, DST-7) and their flipped versions; and (c) 4-point, 8-point, 16-point, or 32-point identity transforms. Basis functions for the DCT-2 and asymmetric DST's used in AV1 are listed below in TABLE 1. TABLE 1 shows AV1 primary transform basis functions DCT-2, DST-4 and DST-7 for N-point input.

TABLE 1

AV1 Primary Transform Basis Functions

| Transform Type | Basis function $T_i(j)$, i, j = 0, 1, . . . , N − 1 |
| --- | --- |
| DCT-2 | $T_i(j) = \omega_0 \cdot \sqrt{\dfrac{2}{N}} \cdot \cos\left(\dfrac{\pi \cdot i \cdot (2j+1)}{2N}\right)$ where $\omega_0 = \begin{cases} \sqrt{\dfrac{2}{N}} & i = 0 \\ 1 & i \neq 0 \end{cases}$ |
| DST-4 | $T_i(j) = \sqrt{\dfrac{2}{N}} \cdot \sin\left(\dfrac{\pi \cdot (2i+1) \cdot (2j+1)}{4N}\right)$ |
| DST-7 | $T_i(j) = \sqrt{\dfrac{4}{2N+1}} \cdot \sin\left(\dfrac{\pi \cdot (2i+1) \cdot (j+1)}{2N+1}\right)$ |

The availability of hybrid transform kernels may be based on the transform block size and prediction mode. This dependency is listed in Table 580 of FIG. 11. Table 580 shows AV1 hybrid transform kernels and their availability based on prediction modes and block sizes. In Table 580, the symbols "→" and "↓" denote the horizontal and vertical dimensions, respectively, and the symbols "✓" and "x" denotes availability and unavailability, respectively, of a kernel for that block size and prediction mode.

For chroma component, the transform type selection may be done in an implicit way. For intra prediction residuals, the transform type may be selected according to the intra prediction mode, as specified below in TABLE 2. For inter prediction residuals, the transform type may be selected according to the transform type selection of the co-located luma block. Therefore, for chroma component, there may be no transform type signaling in the bitstream.

TABLE 2

Transform Type Selection for Chroma Component Intra Prediction Residuals

| Intra prediction | Vertical Transform | Horizontal Transform |
| --- | --- | --- |
| DC_PRED | DCT | DCT |
| V_PRED | ADST | DCT |
| H_PRED | DCT | ADST |
| D45_PRED | DCT | DCT |
| D135_PRED | ADST | ADST |
| D113_PRED | ADST | DCT |
| D157_PRED | DCT | ADST |
| D203_PRED | DCT | ADST |
| D67_PRED | ADST | DCT |
| SMOOTH_PRED | ADST | ADST |
| SMOOTH_V_PRED | ADST | DCT |
| SMOOTH_H_PRED | DCT | ADST |
| PAETH_PRED | ADST | ADST |

[Secondary Transform in VVC]

Figure 12:
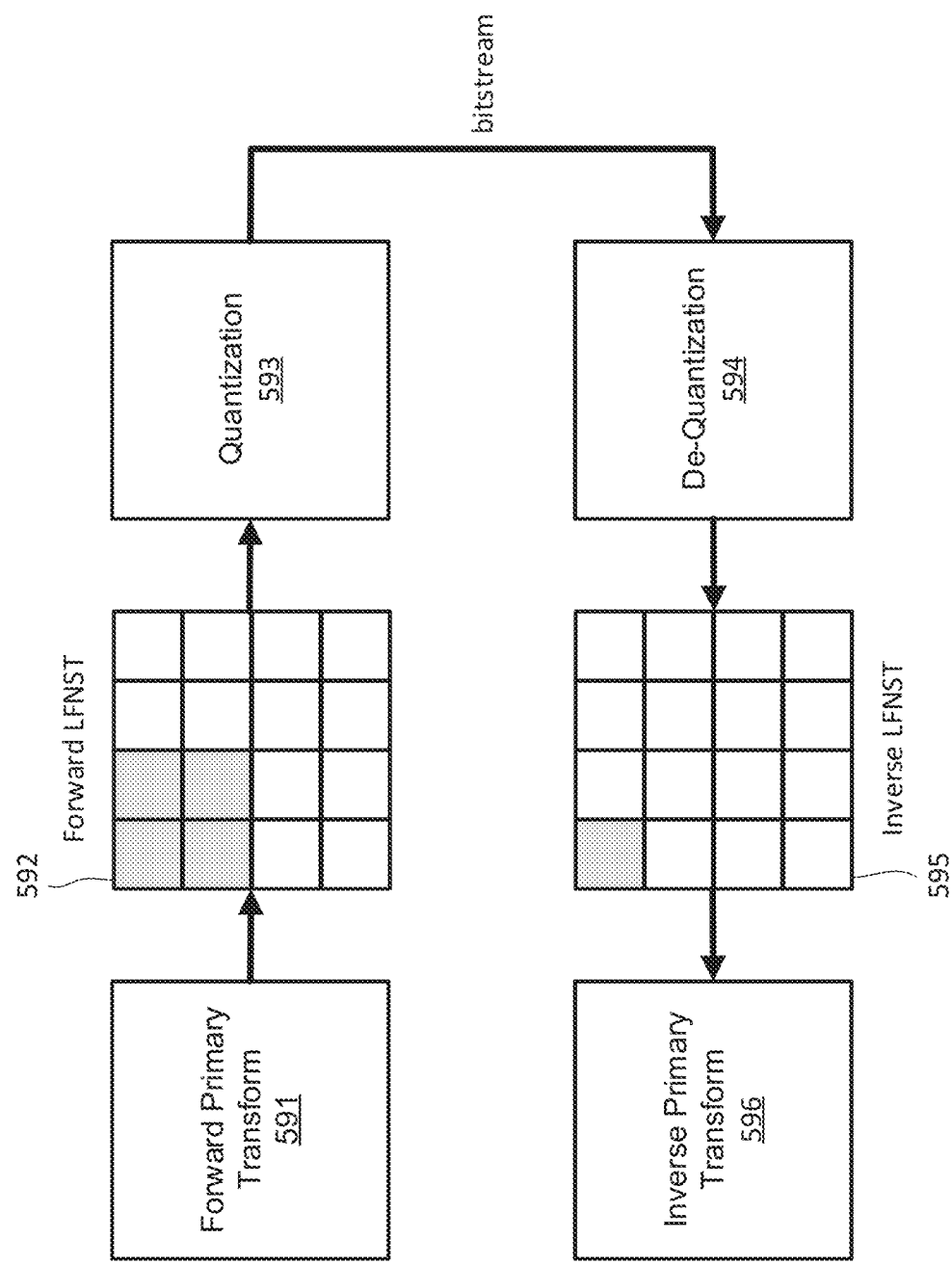
FIG. 12 is a diagram of a low frequency non-separable transform process.

With reference to FIG. 12, in VVC, low-frequency non-separable transform (LFNST), which is known as reduced secondary transform, may be applied between forward primary transform (591) and quantization (593) (at encoder) and between de-quantization (594) and inverse primary transform (596) (at decoder side) to further decorrelate the primary transform coefficients. For example, a forward LFNST (592) may be applied by the encoder and an inverse LFNST (595) may be applied by the decoder. In LFNST, 4×4 non-separable transform or 8×8 non-separable transform may be applied according to block size. For example, 4×4 LFNST may be applied for small blocks (e.g. min (width, height)<8) and 8×8 LFNST may be applied for larger blocks (e.g. min (width, height)>4). For a 4×4 forward LFNST and an 8×8 forward LFNST, the forward LFNST (592) may have 16 and 64 input coefficients, respectively. For a 4×4 inverse LFNST and an 8×8 inverse LFNST, the inverse LFNST (595) may have 8 and 16 input coefficients, respectively.

Application of a non-separable transform, which may be used in LFNST, is described as follows using input as an example. To apply 4×4 LFNST, the 4×4 input block X shown below in Equation (2) may be first represented as a vector $\bar{X}$ as shown below in Equation (3):

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \quad \text{(Eq. 2)}$$

$$\vec{X} = \begin{bmatrix} X_{00} & X_{01} & X_{02} & X_{03} & X_{10} & X_{11} & X_{12} & X_{13} & X_{20} & X_{21} & \ldots & X_{33} \end{bmatrix}^T \quad \text{(Eq. 3)}$$

The non-separable transform may be calculated as $\bar{F} = T \cdot \bar{X}$, where $\bar{F}$ indicates the transform coefficient vector, and T is a 16×16 transform matrix. The 16×1 coefficient vector $\bar{F}$ may be subsequently re-organized as a 4×4 block using the scanning order for that block (e.g. horizontal, vertical, or diagonal). The coefficients with smaller index may be placed with the smaller scanning index in the 4×4 coefficient block.

A. Reduced Non-Separable Transform

LFNST may be based on a direct matrix multiplication approach to apply non-separable transform so that it is implemented in a single pass without multiple iterations. However, the non-separable transform matrix dimension may need to be reduced to minimize computational complexity and memory space to store the transform coefficients. Hence, a reduced non-separable transform (RST) method may be used in LFNST. The main idea of the reduced non-separable transform is to map an N (N is commonly equal to 64 for 8×8 NSST) dimensional vector to an R dimensional vector in a different space, where N/R (R<N) is the reduction factor. Hence, instead of N×N matrix, RST matrix becomes an R×N matrix (600) as shown in FIG. 13.

In the R×N matrix (600), there are R rows of the transform, which are R bases of the N dimensional space. The inverse transform matrix for RT may be the transpose of its forward transform. For an 8×8 LFNST, a reduction factor of 4 may be applied, and 64×64 direct matrix, which is a conventional 8×8 non-separable transform matrix size, may be reduced to be a 16×48 direct matrix. Hence, the 48×16 inverse RST matrix may be used at the decoder side to generate core (primary) transform coefficients in 8×8 top-left regions. When 16×48 matrices are applied instead of 16×64 with the same transform set configuration, each matrix may take 48 input data from three 4×4 blocks in a top-left 8×8 block excluding a right-bottom 4×4 block. With the help of the reduced dimension, memory usage for storing all LFNST matrices may be reduced from 10 KB to 8 KB with reasonable performance drop. In order to reduce complexity, LFNST may be restricted to be applicable only if all coefficients outside the first coefficient sub-group are non-significant. Hence, all primary-only transform coefficients may have to be zero when LFNST is applied. This allows a conditioning of the LFNST index signalling on the last-significant position, and hence avoids the extra coefficient scanning in the current LFNST design, which may be required for checking for significant coefficients at specific positions only. The worst-case handling of LFNST (in terms of multiplications per pixel) restricts the non-separable transforms for 4×4 and 8×8 blocks to 8×16 and 8×48 transforms, respectively. In those cases, the last-significant scan position may have to be less than 8 when LFNST is applied, for other sizes less than 16. For blocks with a shape of 4×N and N×4 and N>8, the restriction may imply that the LFNST is now applied only once, and to the top-left 4×4 region only. As all primary-only coefficients may be zero when LFNST is applied, the number of operations for the primary transforms may be reduced in such cases. From the perspective of the encoder, the quantization of coefficients is remarkably simplified when LFNST transforms are tested. A rate-distortion optimized quantization may be done at maximum for the first 16 coefficients (in scan order), and the remaining coefficients may be enforced to be zero.

B. LFNST Transform Selection

There may be four transform sets and two non-separable transform matrices (kernels) per transform set used in LFNST. The mapping from the intra prediction mode to the transform set may be pre-defined as shown below in TABLE 3. If one of three CCLM modes (INTRA_LT_CCLM, INTRA_T_CCLM, or INTRA_L_CCLM) is used for the current block (81⇐predModeIntra⇐83), transform set 0 may be selected for the current chroma block. For each transform set, the selected non-separable secondary transform candidate may be further specified by the explicitly signalled LFNST index. The index may be signalled in a bit-stream once per Intra CU after transform coefficients.

TABLE 3

Transform Selection Table

| IntraPredMode | Tr. set index |
|---|---|
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode <= 80 | 1 |
| 81 <= IntraPredMode <= 83 | 0 |

C. LFNST Index Signaling and Interaction with Other Tools

Since LFNST may be restricted to be applicable only if all coefficients outside the first coefficient sub-group are non-significant, LFNST index coding may depend on the position of the last significant coefficient. In addition, the LFNST index may be context coded but may not depend on intra prediction mode, and only the first bin may be context coded. Furthermore, LFNST may be applied for intra CU in both intra and inter slices, and for both luma and chroma. If a dual tree is enabled, LFNST indices for Luma and Chroma may be signaled separately. For inter slice (the dual tree is disabled), a single LFNST index may be signaled and used for both luma and chroma.

When intra subpartition (ISP) mode is selected, LFNST may be disabled and RST index may not signaled, because performance improvement may be marginal even if RST is applied to every feasible partition block. Furthermore, disabling RST for ISP-predicted residual may reduce encoding complexity. LFNST may also be disabled and the index may not be signaled when matrix-based intra prediction (MIP) mode is selected.

Considering that a large CU greater than 64×64 may be implicitly split (TU tiling) due to the existing maximum transform size restriction (e.g. 64×64), an LFNST index search may increase data buffering by four times for a certain number of decode pipeline stages. Therefore, the maximum size that LFNST is allowed may be restricted to 64×64. According to embodiments, LFNST may be enabled with DCT2 only.

[Residual Coding in AV1]

For each transform unit, AV1 coefficient coding may start with signaling a skip sign, and may be followed by the transform kernel type and the end-of-block (eob) position when the skip sign is zero. Then, each coefficient value may be mapped to multiple level maps and the sign.

After the eob position is coded, the lower-level map and the middle-level map may be coded in reverse scan order, the former may indicate if the coefficient magnitude is between 0 and 2 while the latter may indicate if the range is between 3 and 14. In the next step, the sign of the coefficient as well as the residual value of the coefficient larger than 14 by Exp-Golomb code may be coded in the forward-scanning order.

As for the use of context modeling, the lower-level map coding may incorporate the transform size and directions as well as up to five neighboring coefficient information. On the other hand, the middle-level map coding may follow a similar approach as with the lower-level amp coding except that the number of neighboring coefficients is down to two. The Exp-Golomb code for the residual level as well as the sign of AC coefficient may be coded without any context model while the sign of DC coefficient is coded using its neighbor transform-unit's dc sign.

[Deep Learning for Video Coding]

Deep learning is a set of learning methods attempting to model data with complex architectures combining different non-linear transformations. The elementary bricks of deep learning are neural networks, which are combined to form deep neural networks.

An artificial neural network is an application, non-linear with respect to its parameters θ that associates to an entry x and an output y=ƒ(x, θ). The parameters θ are estimated from a learning sample. The neural networks can be used for regression or classification. There exist several types of architectures of neural networks: (a) multilayer perceptron, which are the oldest form of neural networks; (b) convolutional neural networks (CNN), particularly adapted for image processing; and (c) recurrent neural networks used for sequential data such as text or times series.

Deep learning and neural networks may be used in video coding mostly due to two reasons: First, unlike traditional machine learning algorithms, a deep learning algorithm will scan the data to search for features such that feature engineering is not needed. Second, deep learning models generalize well with new data especially in image-related tasks.

A. CNN Layers

The strengths of CNN compared to multilayer perceptron are two-fold: CNN has largely reduced amount of weights because the neurons in a layer will only be connected to a small region of the layer before it; Moreover, CNN is translational invariant, making it particularly suitable for processing images without losing spatial information. CNN is composed of several kinds of layers, namely convolutional layers, pooling layers and fully connected layers.

(1) Convolution Layer

The discrete convolution between two functions f and g may be defined as shown below in Equation (4):

$$(f*g)(x)=\Sigma_t f(t)g(x+t) \qquad \text{(Eq. 4)}$$

For 2-dimensional signals such as images, the following Equation (5) for 2D-convolutions may be considered:

$$(K*I)(i,j)=\Sigma_{m,n}K(m,n)I(i+n,j+m) \qquad \text{(Eq. 5)}$$

where K is a convolution kernel applied to a 2D signal (or image) I.

Figure 14:
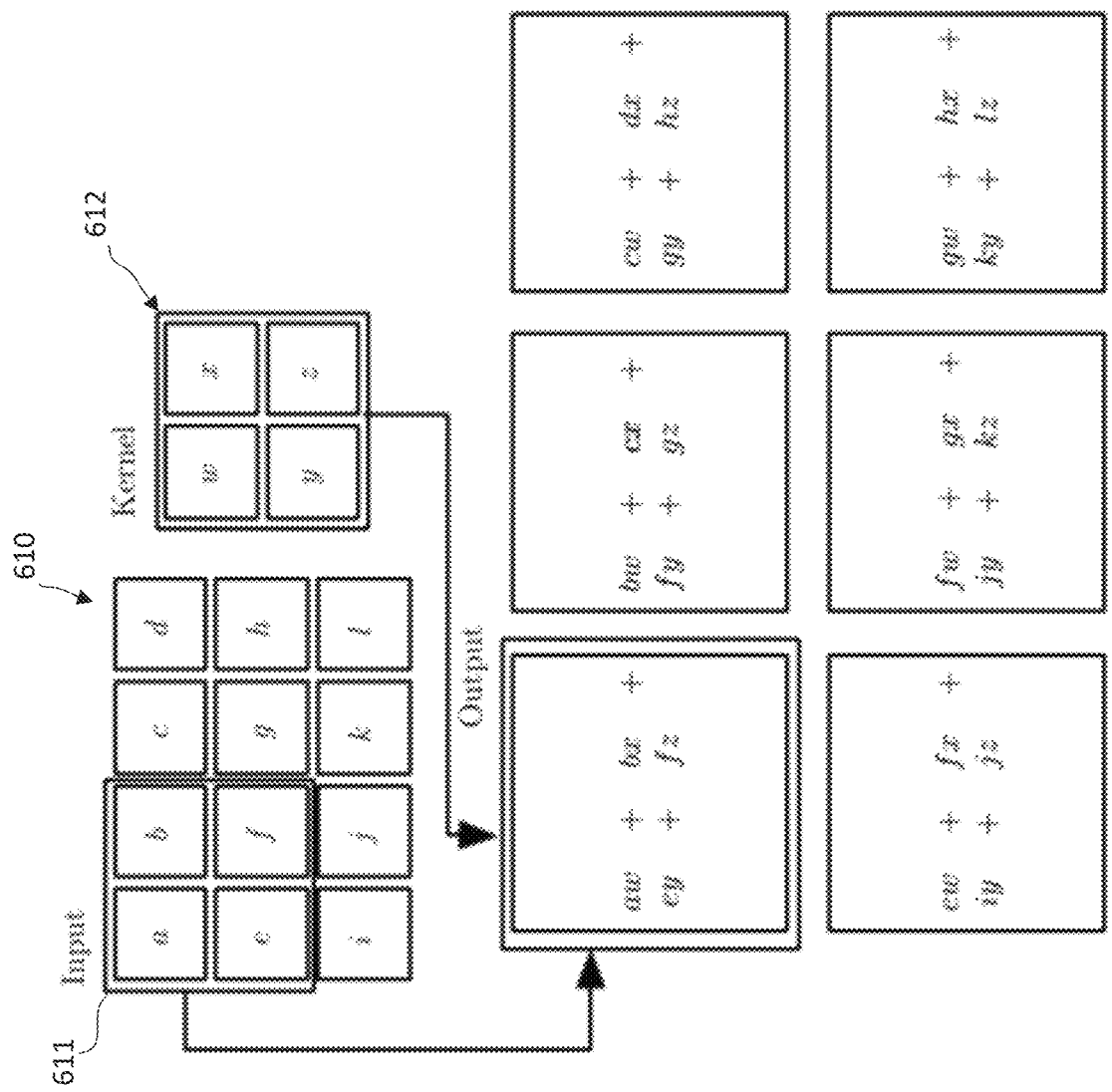
FIG. 14 is a diagram for explaining two-dimensional convolution of a kernel and an image.

With reference to FIG. 14, the principle of 2D convolution is to drag a convolution kernel (612) on an image (610). At each position, the convolution is applied between the convolution kernel and a part (611) of the image that is currently treated. Then, the convolution kernel moves by a number s of pixels, where s is called the stride. Sometimes, zero padding is added, which is a margin of size p containing zero values around the image in order to control the size of the output. Assume that $C_0$ kernels (also called filters) are applied, each of size k×k on an image. If the size of the input image is $W_i \times H_i \times C_i$ ($W_i$ denotes the width, $H_i$ the height, and $C_i$ the number of channels, typically $C_i$=3), the volume of the output is $W_0 \times H_0 \times C_0$, where $C_0$ corresponds to the number of kernels, and $W_0$ and $H_0$ have the relationships shown below in Equations (6) and (7).

$$W_0 = \frac{W_i - k + 2p}{s} + 1 \qquad \text{(Eq. 6)}$$

$$H_0 = \frac{H_i - k + 2p}{s} + 1 \qquad \text{(Eq. 7)}$$

The convolution operations may be combined with an activation function φ in order to add non-linearity to the network: z(x)=φ(K*x+b), where b is a bias. One example is the Rectified Linear Unit (ReLU) activation function which performs max(0, x) operation.

(2) Pooling Layer

Figure 15:
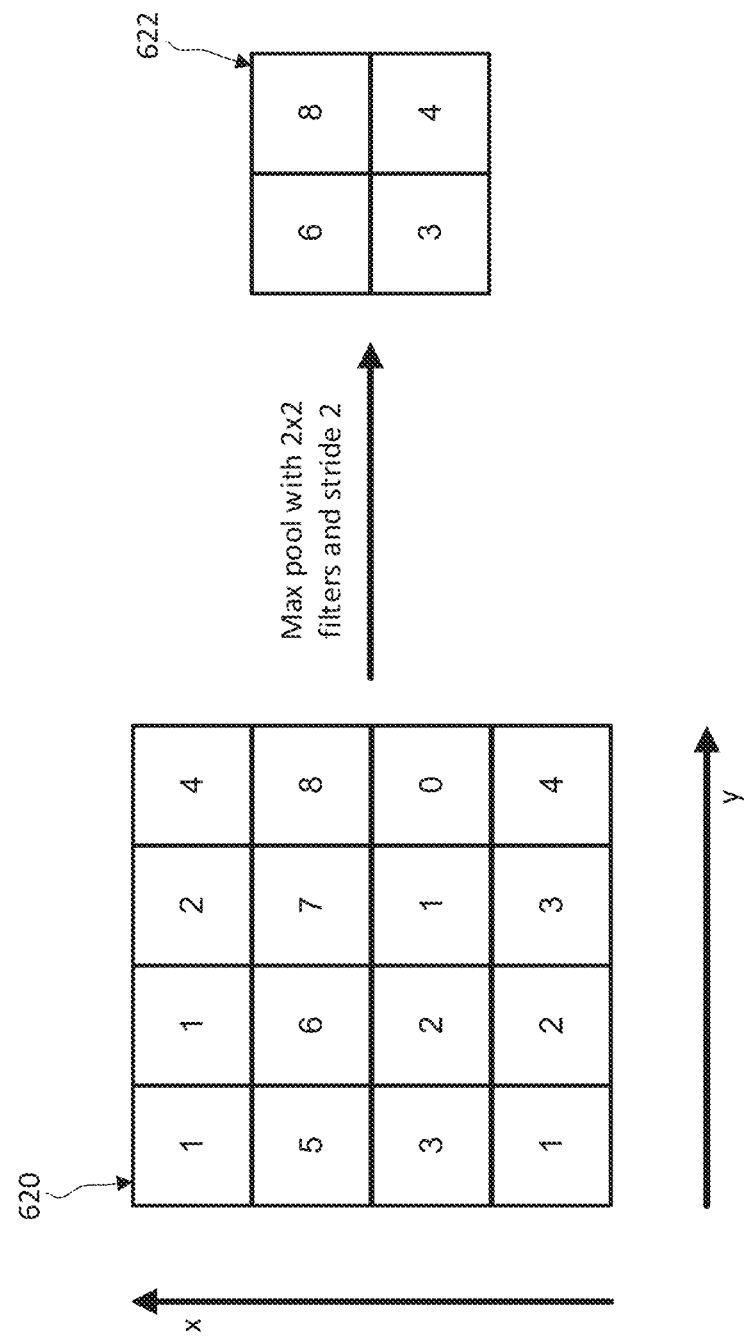
FIG. 15 is a diagram for illustrating max pooling of a patch of an image.

CNN also has pooling layers, which allow to reduce the network dimension, also referred as subsampling, by taking the mean or the maximum on patches of the image (mean-pooling or max-pooling). Like the convolutional layers, pooling layers act on small patches of the image with a stride. In one example, with reference to FIG. 15, consider a 4×4 input patch (620) over which the max-pooling is performed with a stride s=2, the output dimension of the output (622) is half the input dimension in horizontal and vertical directions. It is also possible to reduce the dimension with the convolutional layer, by taking a stride larger than 1, and without zero padding but the advantage of the pooling is that it makes the network less sensitive to small translations of the input images.

(3) Fully Connected Layers

After several convolution and pooling layers, the CNN generally ends with several fully connected layers. The tensors that are the output of previous convolution/pooling layer are transformed into a single vector of values.

B. Applications of CNN in Video Coding (1) Loop Filtering

Figure 16A:
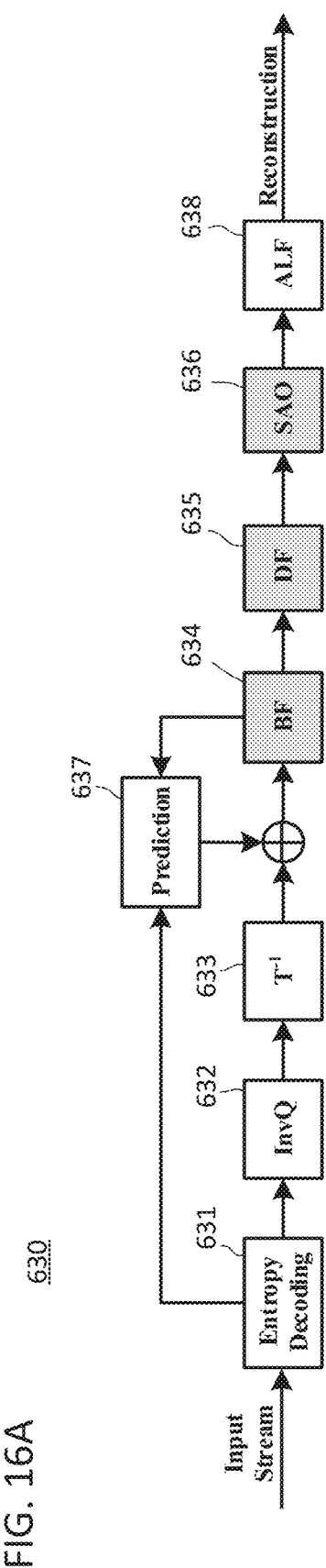
FIG. 16A is a diagram illustrating a first intra decoding process.
Figure 16B:
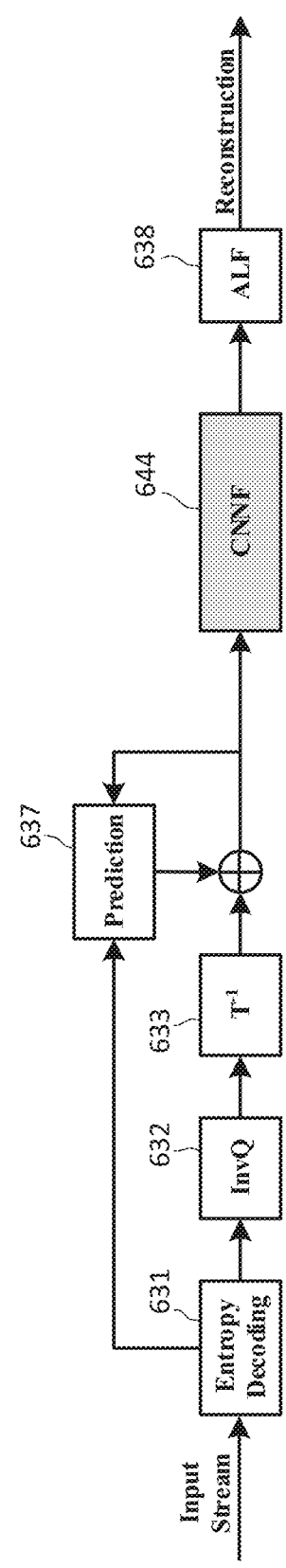
FIG. 16B is a diagram illustrating a second intra decoding process.

In JVET-I0022, a convolutional neural network filter (CNNF) for intra frames is provided. The CNNF works as a loop filter for intra frames to replace the filters in Joint Exploration Model (JEM), i.e., bilateral filter (BF), deblocking filter (DF), and sample adaptive offset (SAO). FIG. 16A illustrates an intra decoding process (630) of JEM that includes entropy decoding (631), inverse quantization (632), inverse transformation (633), BF (634), DF (635), SAO (636), prediction (637) and adaptive loop filter (ALF) (638). FIG. 16B illustrates an intra decoding process that includes CNNF (644) instead of BF (634), DF (635), and SAO (636). For B and P frames, filters may be kept the same as that in JEM 7.0.

Figure 17:
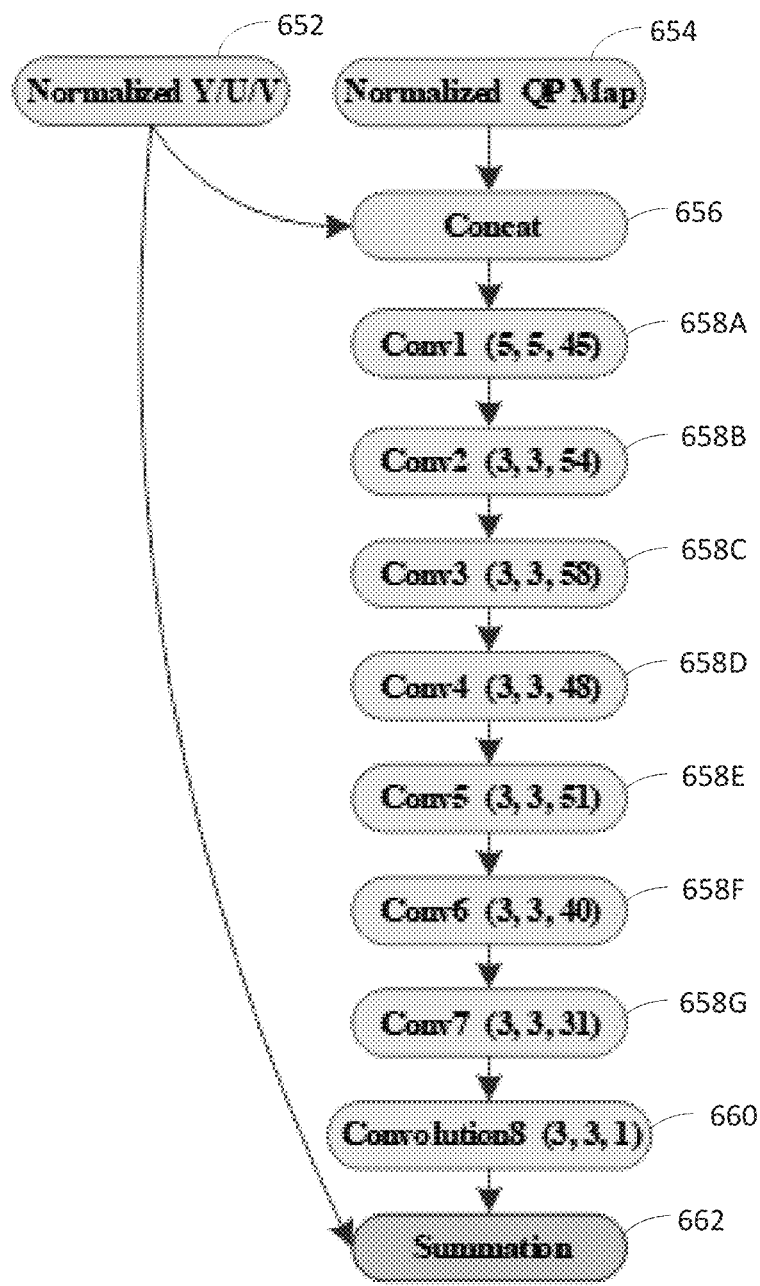
FIG. 17 is a diagram illustrating an example of convolutional neural network filter architecture.

With reference to FIGS. 16B and 17, the CNNF (644) may include two inputs: a reconstruction parameter (652) and a quantization parameter (QP) (654), which may make it possible to use a single set of parameters to adapt to reconstructions with different qualities. Both of the two inputs may be normalized for better convergence in training process. To reduce the complexity, a simple CNN with 10 layers may be adopted. The CNN may be composed by one concatenation layer (656), seven convolution layers (658A-G) with each followed by a ReLU layer, one convolution layer (660), and one summation layer (662). These layers may be connected one by one and form a network. It may be appreciated that the layer parameters above may be included in convolution layer. By connecting the reconstructed Y, U, or V to summation layer, the network is regularized to learn characteristics of the residual between reconstruction image and its original one. According to an embodiment, simulation results report −3.57%, −6.17% and −7.06% BD-rate savings for luma, and both chroma components for JEM-7.0 with AI configuration, and the encoding and decoding time are 107% and 12887% compared with anchor, respectively.

Figure 18:
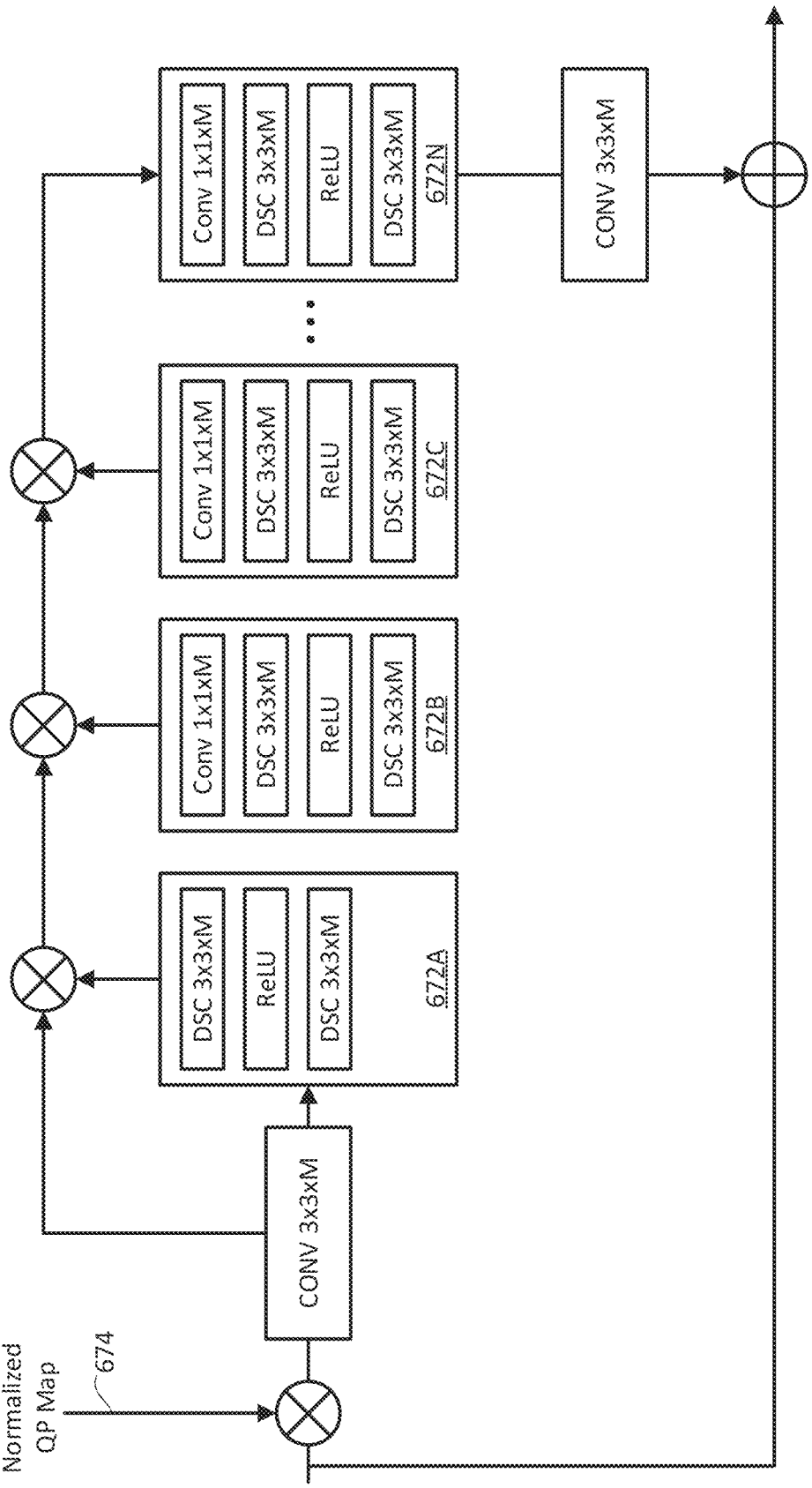
FIG. 18 is a diagram of an example dense residual network.

In JVET-N0254, the experimental results of a dense residual convolutional neural network based in-loop filter (DRNLF) is reported. Referring now to FIG. 18, a structural block diagram of an example dense residual network (DRN) (670) is depicted. The network structure may include N dense residual units (DRUs) (672A-N), and M may denote a number of convolution kernels. For example, N may be set to 4 and M may be set to 32 as a tradeoff between computational efficiency and performance. A normalized QP map (674) may be concatenated with the reconstructed frame as an input to the DRN (670).

Figure 19:
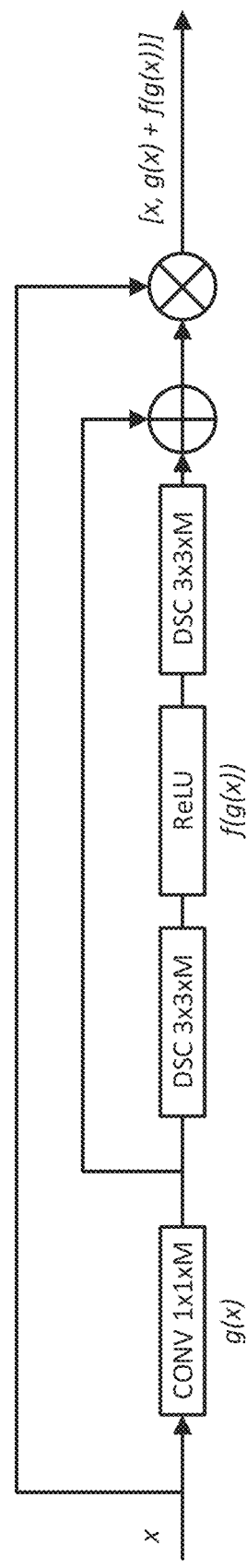
FIG. 19 is a diagram illustrating an example of dense residual unit architecture.

According to embodiments, the DRUs (672A-N) may each have the structure (680) shown in FIG. 19. The DRUs may directly propagate an input to a subsequent unit through a shortcut. To further reduce the computational cost, 3×3 depth-wise separable convolutional (DSC) layer may be applied in the DRU.

The output of the network may have three channels, which corresponds to Y, Cb, Cr, respectively. A filter may be applied for both intra and inter pictures. An additional flag may be signaled for each CTUs to indicate an on/off of the DRNLF. Experimental results of an embodiment show −1.52%, −2.12% and −2.73% BD-rates on Y, Cb, and Cr components, respectively with an All Intra configuration, −1.45%, −4.37% and −4.27% BD-rates with a Random Access configuration, and −1.54%, −6.04% and −5.86% BD-rates in a Low delay configuration. In the embodiment, decoding time is 4667%, 7156%, and 9127% in AI, RA, and LDB configuration.

(2) Intra Prediction

Figure 20:
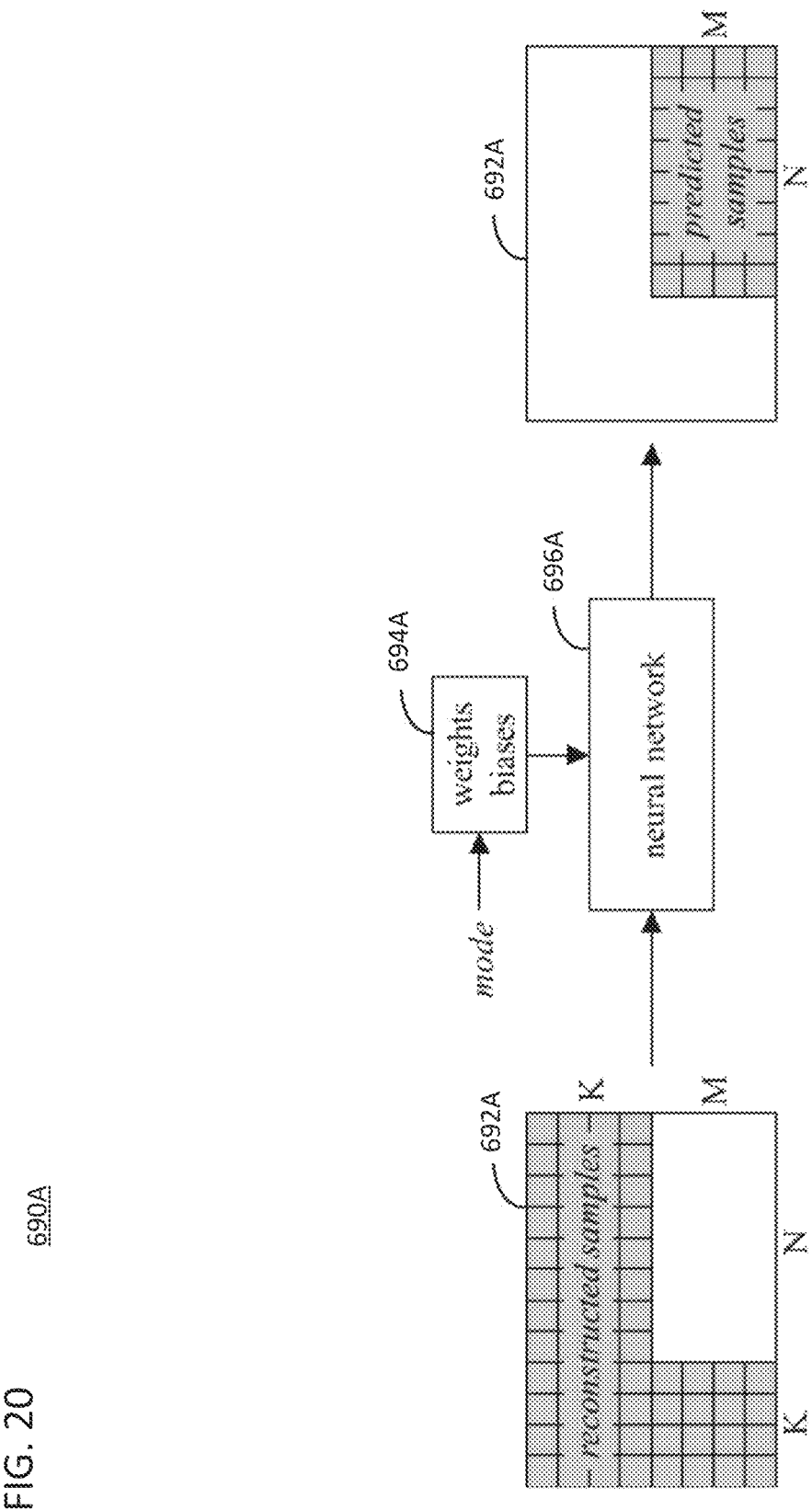
FIG. 20 is a diagram illustrating a first process.
Figure 21:
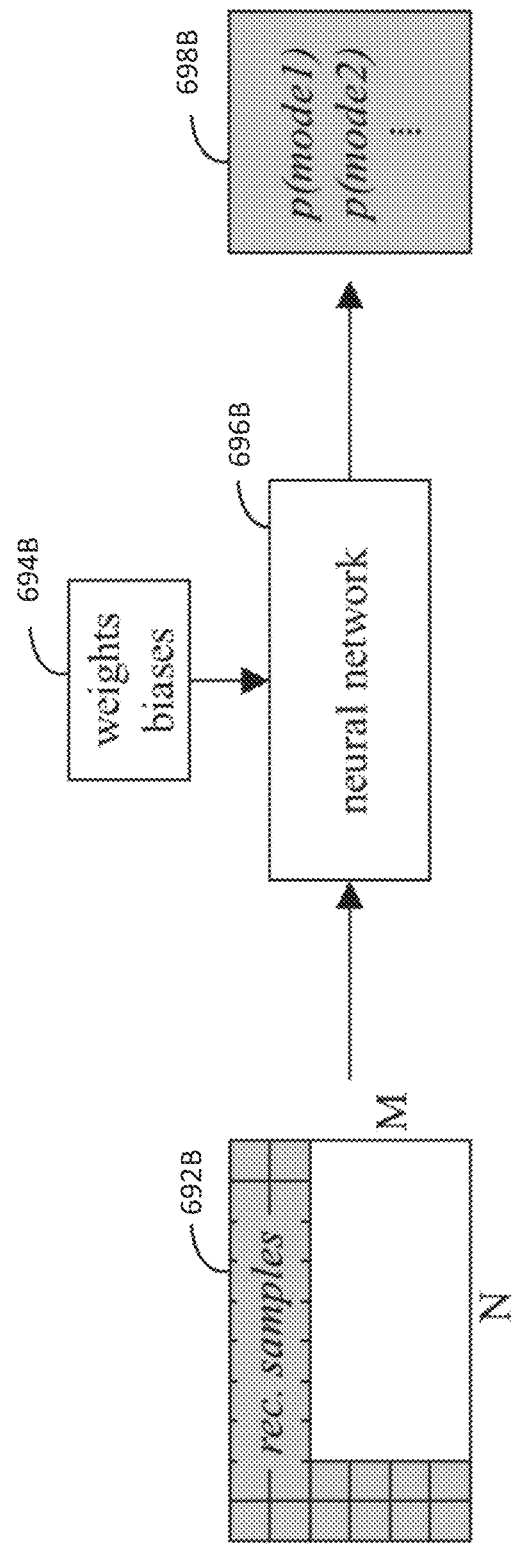
FIG. 21 is a diagram illustrating a second process.
Figure 23B:
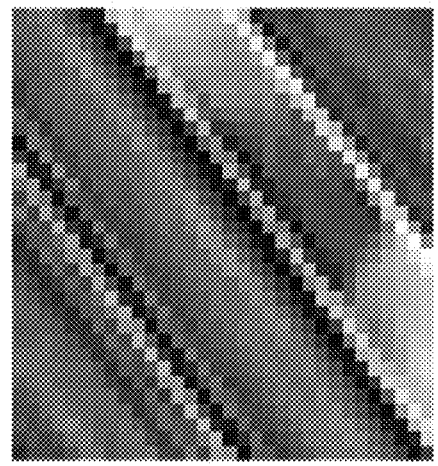
FIG. 23B is an illustration of a second residual pattern according to comparative examples.
Figure 23D:
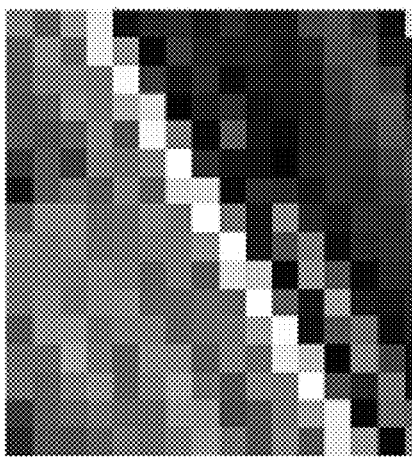
FIG. 23D is an illustration of a fourth residual pattern according to comparative examples.
Figure 23A:
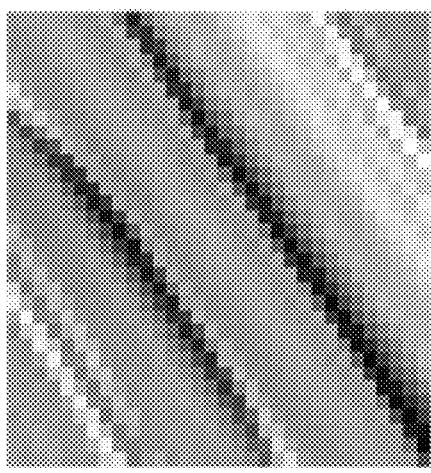
FIG. 23A is an illustration of a first residual pattern according to comparative examples.
Figure 23C:
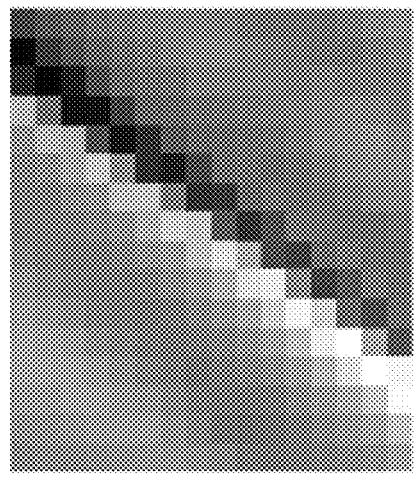
FIG. 23C is an illustration of a third residual pattern according to comparative examples.

Referring now to FIGS. 20 and 21, diagrams of a first process (690A) and a second process (690B) for intra prediction modes are depicted. Intra prediction modes may be used to generate an intra-picture prediction signal on a rectangular block in a future video codec. These intra prediction modes perform the following two main steps: First, a set of features is extracted from the decoded samples. Second, these features are used to select an affine linear combination of predefined image patterns as the prediction signal. Also, a specific signalization scheme may be used for the intra-prediction modes.

Referring to FIG. 20, on a given M×N block (692A) with M≤32 and N≤32, the generation of a luma prediction signal pred is performed by processing a set of reference samples r through a neural network. The reference samples r may consist of K rows of size N+K above and K columns of size M left of the block (692A). The number K may depend on M and N. For example, K may be set to 2 for all M and N.

The neural network (696A) may extract a vector $ftr$ of features from the reconstructed samples r as follows. If $d_0=K*(N+M+K)$ denotes the number of samples of r, then r is regarded as a vector in the real vector space of dimension $d_0$. For fixed integral square-matrices $A_1$ and $A_2$ which have $d_0$ rows resp. columns and for fixed integral bias vectors $b_1$ and $b_2$ of dimension do one first computes the following Equation (8).

$$t_1=\rho(A_1 \cdot r + b_1) \tag{Eq. 8}$$

In Equation (8), "·" denotes the ordinary matrix-vector product. Moreover, the function $\rho$ is an integer-approximation of the ELU function $\rho_0$, where the latter function is defined on a p-dimensional vector v as shown below in Equation (9).

$$\rho_0(v)_i = \begin{cases} v_i, & \text{if } v_i > 0 \\ \exp(v_i) - 1, & \text{else,} \end{cases} \tag{Eq. 9}$$

where $\rho_0(v)_i$ and $v_i$ denote the i-th component of the vectors. One applies similar operations to $t_1$ and computes $t_2$ as shown below in Equation (10).

$$t_2=\rho(A_2 \cdot t_1 + b_2) \tag{Eq. 10}$$

For a fixed integer $d_1$ with $0 \leq d_1 \leq d_0$, there may be a predefined integral matrix $A_3$ with $d_1$ rows and $d_0$ columns and one or more bias weights (694A), such as a predefined integral bias vector $b_3$ of dimension $d_1$ such that one computes the feature vector $ftr$ as shown below in Equation (11).

$$ftr=\rho(A_3 \cdot t_2 + b_3). \tag{Eq. 11}$$

The value of $d_1$ depends on M and N. At the moment, one puts $d_1=d_0$.

Out of the feature vector $ftr$, the final prediction signal pred is generated using an affine linear map followed by the standard Clipping operation Clip that depends on the bit-depth. Thus, there is a predefined matrix $A_4$ with M*N rows and $d_1$ columns and a predefined bias vector $b_4$ of dimension M*N such that one computes pred as shown below in Equation (12).

$$\text{pred}=\text{Clip}(A_4 \cdot ftr + b_4) \tag{Eq. 12}$$

Referring now to FIG. 21, n different intra prediction modes (698B) are to be used, where n is set to 35 for max(M,N)<32 and to 11 else. Thus, an index predmode with 0≤predmode<n is to be signaled by an encoder and to be parsed by a decoder and the following syntax may be used. One has $n=3+2^k$, where k=3 if max(M,N)=32 and k=5, else. In a first step, an index predIdx with 0≤predIdx<n is signaled using the following code. First, one bin encodes whether predIdx<3 or not. If predIdx<3, a second bin encodes if predIdx=0 or not, and, if predIdx≠0, another bin encodes whether predIdx is equal to 1 or 2. If predIdx≥3 then the value of predIdx is signaled in the canonical way using k bins.

From the index predIdx, the actual index predmode is derived using a fully connected neural network (696B) with one hidden layer that has the reconstructed samples r' on the two rows of size N+2 above and the two columns of size M left of a block (692B) as input.

The reconstructed samples r' are regarded as a vector in the real vector space of dimension 2*(M+N+2). There is a fixed square-matrix $A_1'$ which has 2*(M+N+2) rows resp. columns and there may be one or more bias weights (694B), such as a fixed bias vector $b_1'$ in the real vector space of dimension 2*(M+N+2) such that one computes $t_1'$ as shown below in Equation (13).

$$t_1' = \rho(A_1' \cdot r' + b_1') \quad \text{(Eq. 13)}$$

There may exist a matrix $A_2'$ which has n rows and 2*(M+N+2) columns and there may be a fixed bias vector $b_2'$ in the real vector space of dimension n such that one computes lgt as shown below in Equation (14).

$$lgt = A_2' \cdot t_1' + b_2' \quad \text{(Eq. 14)}$$

The index predmode is now derived as being the position of the predIdx-th largest component of lgt. Here, if two components $(lgt)_k$ and $(lgt)_l$ are equal for k≠l, $(lgt)_k$ is regarded as larger than $(lgt)_l$ if k<l and $(lgt)_l$ is regarded as larger than $(lgt)_k$, else.

[Multiple Transform Selection]

In addition to DCT-II which has been employed in HEVC, a Multiple Transform Selection (MTS) scheme may be used for residual coding both inter and intra coded blocks. The scheme may include multiple selected transforms from the DCT8/DST7. According to embodiments, DST-VII and DCT-VIII may be included. TABLE 4 shows transform basis functions of selected DST/DCT for N-point input.

TABLE 4

Transform Basis Functions of DCT-II/VIII and DSTVII for N-Point Input

| Transform Type | Basis function $T_i(j)$, i, j = 0, 1, . . . , N − 1 |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$ where $\omega_0 = \begin{cases} \sqrt{\dfrac{2}{N}} & i = 0 \\ 1 & i \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

In order to keep the orthogonality of the transform matrix, the transform matrices may be quantized more accurately than the transform matrices in HEVC. To keep the intermediate values of the transformed coefficients within the 16-bit range, after horizontal and after vertical transform, all the coefficients may be required to have 10-bit.

In order to control MTS scheme, separate enabling flags may be specified at SPS level for intra and inter, respectively. When MTS is enabled at SPS, a CU level flag may be signaled to indicate whether MTS is applied or not. According to embodiments, MTS may be applied only for luma. The MTS signaling may be skipped when one of the following conditions is applied: (1) The position of the last significant coefficient for the luma TB is less than 1 (i.e., DC only), or (2) the last significant coefficient of the luma TB is located inside the MTS zero-out region.

If MTS CU flag is equal to zero, then DCT2 may be applied in both directions. However, if MTS CU flag is equal to one, then two other flags may be additionally signaled to indicate the transform type for the horizontal and vertical directions, respectively. TABLE 5 below shows an example transform and signaling mapping table. The transform selection for ISP and implicit MTS may be unified by removing the intra-mode and block-shape dependencies. If the current block is ISP mode or if the current block is intra block and both intra and inter explicit MTS is on, then only DST7 may be used for both horizontal and vertical transform cores. When it comes to transform matrix precision, 8-bit primary transform cores may be used. Therefore, all the transform cores used in HEVC may be kept as the same, including 4-point DCT-2 and DST-7, 8-point, 16-point, and 32-point DCT-2. Also, other transform cores including 64-point DCT-2, 4-point DCT-8, 8-point, 16-point, 32-point DST-7, and DCT-8, may use 8-bit primary transform cores.

TABLE 5

Transform and Signaling Mapping Table

| | | | Intra/inter | |
|---|---|---|---|---|
| MTS_CU_flag | MTS_Hor_flag | MTS_Ver_flag | Horizontal | Vertical |
| 0 | | | DCT2 | |
| 1 | 0 | 0 | DST7 | DST7 |
| | 0 | 1 | DCT8 | DST7 |
| | 1 | 0 | DST7 | DCT8 |
| | 1 | 1 | DCT8 | DCT8 |

To reduce the complexity of large size DST-7 and DCT-8, high frequency transform coefficients may be zeroed out for the DST-7 and DCT-8 blocks with size (width or height, or both width and height) equal to 32. Only the coefficients within the 16×16 lower-frequency region may be retained.

As in HEVC, the residual of a block can be coded with transform skip mode. To avoid the redundancy of syntax coding, the transform skip flag may not be signalled when the CU level MTS_CU_flag is not equal to zero. According to embodiments, implicit MTS transform may be set to DCT2 when LFNST or MIP is activated for the current CU. Also, the implicit MTS can be still enabled when MTS is enabled for inter coded blocks.

[Non-Separable Secondary Transform]

In JEM, a mode-dependent non-separable secondary transform (NSST) may be applied between the forward core transform and quantization (at the encoder) and between the de-quantization and inverse core transform (at the decoder). To keep low complexity, NSST may only be applied to the low frequency coefficients after the primary transform. If both width (W) and height (H) of a transform coefficient block is larger than or equal to 8, then 8×8 non-separable secondary transform may be applied to the top-left 8×8 region of the transform coefficients block. Otherwise, if either W or H of a transform coefficient block is equal to 4, a 4×4 non-separable secondary transform may be applied and the 4×4 non-separable transform may be performed on the top-left min(8,W)×min(8,H) region of the transform coefficient block. The above transform selection rule may be applied for both luma and chroma components.

Matrix multiplication implementation of a non-separable transform may be performed as described above in the "Secondary Transform in VVC" sub-section, with respect to Equations (2)-(3). According to embodiments, non-separable secondary transform can be implemented using direct matrix multiplication.

[Mode Dependent Transform Core Selection]

There may be 35×3 non-separable secondary transforms for both 4×4 and 8×8 block size, where 35 is the number of transform sets specified by the intra prediction mode, denoted as set, and 3 is the number of non-separable secondary transform (NSST) candidates for each intra prediction mode. The mapping from the intra prediction mode to the transform set may be defined as shown in Table 700 illustrated in FIG. 22. The transform set applied to luma/chroma transform coefficients may be specified by the corresponding luma/chroma intra prediction modes, according to Table 700. For intra prediction modes larger than 34 (diagonal prediction direction), the transform coefficient block may be transposed before/after the secondary transform at the encoder/decoder.

For each transform set, the selected non-separable secondary transform candidate may be further specified by an explicitly signalled CU-level NSST index. The index may be signalled in a bitstream once per intra CU after transform coefficients and truncated unary binarization is used. The truncated value may be 2 in case of planar or DC mode, and 3 for angular intra prediction mode. This NSST index may be signalled only when there is more than one non-zero coefficient in a CU. The default value may be zero when it is not signalled. Zero value of this syntax element may indicate secondary transform is not applied to the current CU, values 1-3 may indicate which secondary transform from the set should be applied.

In the JEM, NSST may not be applied for a block coded with transform skip mode. When the NSST index is signalled for a CU and not equal to zero, NSST may not be used for a block of a component that is coded with transform skip mode in the CU. When a CU with blocks of all components are coded in transform skip mode or the number of non-zero coefficients of non-transform-skip mode CBs is less than 2, the NSST index may not be signalled for the CU.

[Problems with Transform Schemes of Comparative Embodiments]

In comparative embodiments, separable transform schemes are not very efficient for capturing directional texture patterns (e.g. edges which are in a 45/135-degree direction). A non-separable transform scheme may be helpful for improving the coding efficiency in those scenarios. To reduce the computational complexity and memory footprint, the non-separable transform schemes are usually devised as secondary transforms applied on top of the low frequency coefficients of the primary transform. In existing implementations, the selection of a transform kernel to be used (from a group of transform kernels, both primary/secondary and separable/non-separable) is based on the prediction mode information. But the prediction mode information alone can provide only a coarse representation of the entire space of residual patterns observed for that prediction mode, as shown by representations 710, 720, 730, and 740 of FIGS. 23A-D. Representations 710, 720, 730, and 730 show residual patterns observed for D45 (45°) intra prediction mode in AV1. Neighboring reconstructed samples can provide additional information for more efficient representation of those residual patterns.

For transform schemes with multiple transform kernel candidates, a transform set may need to be identified using coded information that is available for both encoder and decoder. In existing multiple transform schemes, such as MTS and NSST, the transform set is selected based on based on coding prediction mode information, such as the intra prediction mode. However, prediction mode does fully cover all of the statistics of the prediction residuals and neighboring reconstructed samples can provide additional information for more efficient classification of prediction residual. Neural network-based methods can be applied for efficient classification of prediction residuals, and therefore provide more efficient transform set selection.

EXAMPLE ASPECTS OF EMBODIMENTS OF THE PRESENT DISCLOSURE

Embodiments of the present disclosure may be used separately or combined in any order. Further, each of the embodiments (e.g. methods, encoders, and decoders) may be implemented by processing circuitry (e.g. one or more processors or one or more integrated circuits). In one example, the one or more processors execute a program that is stored in a non-transitory computer-readable medium.

Embodiments of the present disclosure may incorporate any number of aspects as described above. Embodiments of the present disclosure may also incorporate one or more of the aspects described below, and solve the problems discussed above and/or other problems.

A. First Aspect

According to embodiments, neighboring reconstructed samples may be used for selecting a transform set.

In one or more embodiments, from a group of transform sets, a sub-group of transform sets is selected using coded information, such as prediction mode (e.g. intra prediction mode or inter prediction mode). In one embodiment, from the selected sub-group of transform sets, one transform set is identified using other coded information, such as the type of intra/inter prediction mode, block size, prediction block samples of the current block, and the neighboring reconstructed samples of the current block. Finally, the transform candidate for the current block is selected from the identified transform set using the associated index signaled in the bitstream. In one embodiment, from the selected sub-group of transform sets, the final transform candidate is identified implicitly using other coded information, such as the type of intra/inter prediction mode, block size, prediction block samples of the current block and the neighboring reconstructed samples of the current block.

In one or more embodiments, the neighboring reconstructed samples set may include samples from previously reconstructed neighboring blocks. In one embodiment, the neighboring reconstructed samples set may include one or more lines of top and left neighboring reconstructed samples. In one example, the number of lines of the top and/or left neighboring reconstructed samples is the same as the maximum number of lines of neighboring reconstructed samples used for intra prediction. In one example, the number of lines of the top and/or left neighboring reconstructed samples is the same as the maximum number of lines of neighboring reconstructed samples used for CfL prediction mode. In one embodiment, the neighboring reconstructed samples set may include all the samples from neighboring reconstructed blocks.

In one or more embodiments, the group of transform sets include only primary transform kernels, only secondary transform kernels, or a combination of primary and secondary transform kernels. In a case where the group of transform sets include only primary transform kernels, the primary transform kernels may be separable, may be non-separable, may use different types of DCTs/DSTs, or use different Line Graph Transforms with different self-loop rates. In a case where the group of transform sets include only secondary transform kernels, the secondary transform kernels may be non-separable or use different non separable Line Graph Transforms with different self-loop rates.

In one or more embodiments, the neighboring reconstructed samples may be processed to derive an index associated with a specific transform set. In one embodiment, the neighboring reconstructed samples are input to a transform process, and the transform coefficients are used to identify the index associated with a specific transform set. In one embodiment, the neighboring reconstructed samples are input to multiple transform processes, and a cost function is used to evaluate the cost value of each transform process. Then, the cost values are used to select the transform set index. Example cost value includes but are not limited to, the sum of magnitude of first N (e.g. 1, 2, 3, 4, . . . , 16) transform coefficients along a certain scanning order. In one embodiment, a classifier is pre-defined, and the neighboring reconstructed samples are input to the classifier to identify the transform set index.

B. Second Aspect

According to embodiments, a neural network-based transform set selection scheme may be provided. The input of the neural network includes, but is not limited to, the prediction block samples of the current block, the neighboring reconstructed samples of the current block, and the output may be an index that is used to identify a transform set.

In one or more embodiments, a group of transform sets is defined, and a sub-group of transform sets is selected using coded information, such as prediction mode (e.g. intra prediction mode or inter prediction mode), then one transform set of the selected sub-group of transform sets is identified using other code information, such as the prediction block samples of the current block, the neighboring reconstructed samples of the current block. Then, the transform candidate for the current block is selected from the identified transform set using the associated index signaled in the bitstream.

In one or more embodiments, the neighboring reconstructed samples may include one or more lines of top and left neighboring reconstructed samples. In one example, the number of lines of the top and/or left neighboring reconstructed samples is the same as the maximum number of lines of neighboring reconstructed samples used for intra prediction. In one example, the number of lines of the top and/or left neighboring reconstructed samples is same as the maximum number of lines of neighboring reconstructed samples used for CfL prediction mode.

In one or more embodiments, the neighboring reconstructed samples and/or the prediction block samples of the current block are inputs of the neural network, and the output not only includes an identifier to a transform set but also includes an identifier to a prediction mode set. In other words, the neural network uses the neighboring reconstructed samples and/or the prediction block samples of the current block to identify certain combinations of transform set and prediction mode.

In one or more embodiments, the neural network is used to identify a transform set that is for secondary transform. Alternatively, the neural network is used to identify a transform set that is used for primary transform. Alternatively, the neural network is used to identify a transform set that is used for specifying a combination of secondary and primary transform. In one embodiment, the secondary transform is using a non-separable transform scheme. In one embodiment, the primary transform may use different types of DCTs/DSTs. In another embodiment, the primary transform may use different Line Graph Transforms with different self-loop rates.

In one or more embodiments, for different block sizes, the neighboring reconstructed samples and/or the prediction block samples of the current block may be further upsampled or downsampled before being used as the input of the neural network.

In one or more embodiments, for different internal bit depth, the neighboring reconstructed samples and/or the prediction block samples of the current block may be further scaled (or quantized) according to the internal bit depth value before being used as the input of the neural network.

In one or more embodiments, the parameters used in the neural network depends on coded information, including but not limited to: whether the block is intra coded or not, the block width and/or block height, quantization parameter, whether the current picture is coded as an intra (key) frame or not, and the intra prediction mode.

Figure 24:
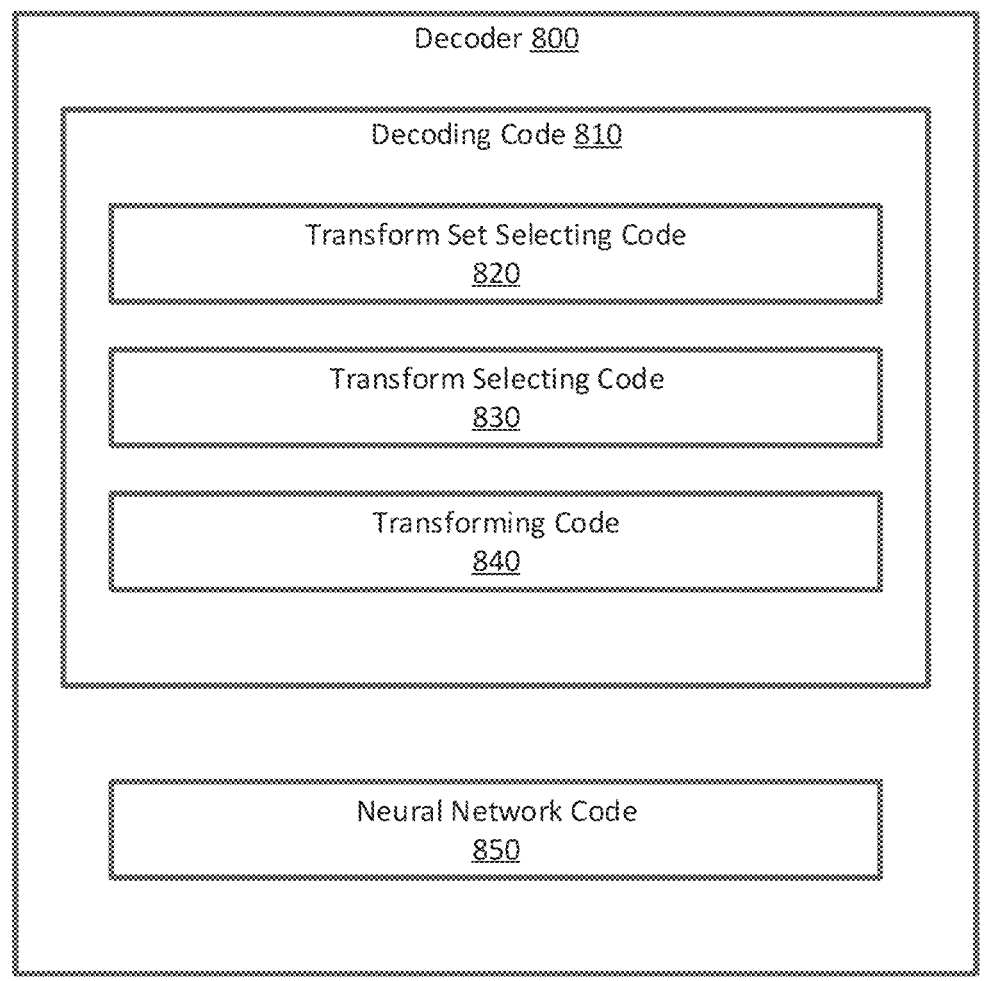
FIG. 24 is a schematic diagram of a decoder according to an embodiment of the present disclosure.

According to embodiments, at least one processor and memory storing computer program instructions may be provided. The computer program instructions, when executed by the at least one processor, may implement an encoder or a decoder and may perform any number of the functions described in the present disclosure. For example, with reference to FIG. 24, the at least one processor may implement a decoder (800). The computer program instructions may include, for example, decoding code (810) that is configured to cause the at least one processor to decode a block of a picture from a coded bitstream that is received (e.g. from an encoder). The decoding code (810) may include, for example, transform set selecting code (820), transform selecting code (830), and transforming code (840).

The transform set selecting code (820) may cause the at least one processor to select a transform set in accordance with embodiments of the present disclosure. For example, the transform set selecting code (820) may cause the at least one processor to select a transform set based on at least one neighboring reconstructed sample from one or more previously decoded neighboring blocks or from a previously decoded picture. According to embodiments, the transform set selecting code (820) may be configured to cause the at least one processor to select a sub-group of transform sets from a group of transform sets based on first coded information, and select the transform set from the sub-group, in accordance with embodiments of the present disclosure.

The transform selecting code (830) may cause the at least one processor to select a transform candidate from the transform set in accordance with embodiments of the present disclosure. For example, transform selecting code (830) may cause the at least one processor to select a transform candidate from the transform set the based on an index value signaled in the coded bitstream, in accordance with embodiments of the present disclosure.

The transforming code (840) may cause the at least one processor to inverse transform coefficients of the block using a transform (e.g. the transform candidate) from the transform set, in accordance with embodiments of the present disclosure.

According to embodiments, the decoding code 810 may cause a neural network to be used in selecting the transform group, the transform sub-group, the transform set, and/or the transform, or otherwise perform at least a part of the decoding, in accordance with embodiments of the present disclosure. According to embodiments, the decoder (800) may further include neural network code (850) that is configured to cause the at least one processor to implement the neural network, in accordance with embodiments of the present disclosure.

According to embodiments, the encoder-side processes corresponding to the above processes may be implemented by encoding code for encoding a picture as would be understood by a person of ordinary skill in the art, based on the above descriptions.

The techniques of embodiments of the present disclosure described above, can be implemented as computer software using computer-readable instructions and physically stored in one or more computer-readable media. For example, FIG. 25 shows a computer system (900) suitable for implementing embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 25 for computer system (900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove, joystick (905), microphone (906), scanner (907), and camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove, or joystick (905), but there can also be tactile feedback devices that do not serve as input devices). For example, such devices may be audio output devices (such as: speakers (909), headphones (not depicted)), visual output devices (such as screens (910) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example USB ports of the computer system (900); others are commonly integrated into the core of the computer system 900 by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment (955). Certain protocols and protocol stacks can be used on each of those networks and network interfaces as described above.

Aforementioned human interface devices, human-accessible storage devices, and network interfaces (954) can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators (944) for certain tasks, and so forth. These devices, along with Read-only memory (ROM) (945), Random-access memory (946), internal mass storage such as internal non-user accessible hard drives, SSDs, and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). Architectures for a peripheral bus include PCI, USB, and the like. A graphics adapter (950) may be included in the core (940).

CPUs (941), GPUs (942), FPGAs (943), and accelerators (944) can execute certain instructions that, in combination, can make up the aforementioned computer code. That computer code can be stored in ROM (945) or RAM (946).

Transitional data can be also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments of the present disclosure can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting example embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method performed by at least one processor, the method comprising:
    receiving a coded bitstream; and
    decoding a block of a picture from the coded bitstream, the decoding comprising:
        selecting a transform set based on at least one neighboring reconstructed sample from one or more previously decoded neighboring blocks or from a previously decoded picture; and
        inverse transforming coefficients of the block using a transform from the transform set,
    wherein the selecting the transform set comprises:
        selecting a sub-group of transform sets from a group of transform sets based on coded information of an intra prediction mode or an inter prediction mode; and
        selecting the transform set from the sub-group,
    the selecting the transform set from the sub-group comprises selecting the transform set based on coded information of a type of the intra prediction mode or the inter prediction mode, a block size, prediction block samples of the block, or the at least one neighboring reconstructed sample, and
    the method further comprises selecting a transform candidate from the transform set based on an index value signaled in the coded bitstream.

2. The method of claim 1, wherein the selecting the transform set from the sub-group comprises selecting the transform set based on the coded information of the type of the intra prediction mode or the inter prediction mode.

3. The method of claim 2, wherein the selecting the transform set from the sub-group comprises selecting the transform set based on the coded information of the type of the inter prediction mode.

4. The method of claim 1, wherein the at least one neighboring reconstructed sample includes a reconstructed sample from the one or more previously decoded neighboring blocks.

5. The method of claim 1, wherein
    the group of transform sets includes only secondary transform kernels.

6. The method of claim 5, wherein the second transform kernels are non-separable.

7. The method of claim 1, wherein the transform set is a secondary transform.

8. A system comprising:
    at least one memory configured to store computer program code; and
    at least one processor configured to access the computer program code and operate as instructed by the computer program code, the computer program code comprising decoding code that is configured to cause the at least one processor to decode a block of a picture from a coded bitstream that is received,
    wherein the decoding code comprises:
        transform set selecting code configured to cause the at least one processor to select a transform set based on at least one neighboring reconstructed sample from one or more previously decoded neighboring blocks or from a previously decoded picture; and
        transforming code configured to cause the at least one processor to inverse transform coefficients of the block using a transform from the transform set,
    wherein the transform set selecting code is configured to cause the at least one processor to:
        select a sub-group of transform sets from a group of transform sets based on coded information of an intra prediction mode or an inter prediction mode; and
        select the transform set from the sub-group,
    the transform set selecting code is configured to cause the at least one processor to select the transform set based on coded information of a type of the intra prediction mode or the inter prediction mode, a block size, prediction block samples of the block, or the at least one neighboring reconstructed sample, and
    the decoding code further comprises transform selecting code configured to cause the at least one processor to select a transform candidate from the transform set based on an index value signaled in the coded bitstream.

9. The system of claim 8, wherein the transform set selecting code is configured to cause the at least one processor to select the transform set based on the coded information of the type of the intra prediction mode or the inter prediction mode.

10. The system of claim 9, wherein the transform set selecting code is configured to cause the at least one processor to select the transform set based on the coded information of the type of the inter prediction mode.

11. The system of claim 8, wherein the at least one neighboring reconstructed sample includes a reconstructed sample from the one or more previously decoded neighboring blocks.

12. The system of claim 8, wherein
the group of transform sets includes only secondary transform kernels.

13. The system of claim 12, wherein the second transform kernels are non-separable.

14. A non-transitory computer-readable medium storing computer instructions that are configured to, when executed by at least one processor, cause the at least one processor to decode a block of a picture from a received coded bitstream by:
    selecting a transform set based on at least one neighboring reconstructed sample from one or more previously decoded neighboring blocks or from a previously decoded picture; and
    inverse transforming coefficients of the block using a transform from the transform set,
    wherein the selecting the transform set comprises:
        selecting a sub-group of transform sets from a group of transform sets based on coded information of an intra prediction mode or an inter prediction mode; and
        selecting the transform set from the sub-group,
    the selecting the transform set from the sub-group comprises selecting the transform set based on coded information of a type of the intra prediction mode or the inter prediction mode, a block size, prediction block samples of the block, or the at least one neighboring reconstructed sample, and
    the computer instructions are further configured to, when executed by the at least one processor, cause the at least one processor to decode the block by selecting a transform candidate from the transform set based on an index value signaled in the coded bitstream.

15. The method of claim 1, wherein the selecting the transform set from the sub-group comprises selecting the transform set based on the coded information of the block size.

16. The method of claim 1, wherein the selecting the transform set from the sub-group comprises selecting the transform set based on the coded information of the prediction block samples of the block.

17. The method of claim 1, wherein the selecting the transform set from the sub-group comprises selecting the transform set based on the coded information of the at least one neighboring reconstructed sample.

* * * * *